US 7,804,764 B2

(12) United States Patent
Hara et al.

(10) Patent No.: US 7,804,764 B2
(45) Date of Patent: Sep. 28, 2010

(54) TRANSMITTER AND RECEIVER

(75) Inventors: Takao Hara, Ikoma (JP); Anwar Khoirul, Ikoma (JP); Kiyotake Ando, Tokyo (JP)

(73) Assignees: National University Corporation Nara Institute of Science and Technology, Nara (JP); Sky Perfect JSAT Corporation, Tokyo (JP)

( * ) Notice: Subject to any disclaimer, the term of this patent is extended or adjusted under 35 U.S.C. 154(b) by 163 days.

(21) Appl. No.: 11/989,869

(22) PCT Filed: Aug. 1, 2006

(86) PCT No.: PCT/JP2006/315230

§ 371 (c)(1),
(2), (4) Date: Mar. 6, 2008

(87) PCT Pub. No.: WO2007/015490

PCT Pub. Date: Feb. 8, 2007

(65) Prior Publication Data

US 2008/0219147 A1    Sep. 11, 2008

(51) Int. Cl.
  *H04J 11/00* (2006.01)
(52) U.S. Cl. .................................................. 370/210
(58) Field of Classification Search ............... 370/203, 370/204, 206, 207, 208, 210, 209; 375/135, 375/136, 146, 147, 260, 362
See application file for complete search history.

(56) References Cited

U.S. PATENT DOCUMENTS 6,654,339 B1    11/2003   Böhnke et al.

7,031,371 B1 *   4/2006   Lakkis ....................... 375/146
2003/0007190 A1   1/2003   Kaku et al.

(Continued)

FOREIGN PATENT DOCUMENTS

CN           1392671         1/2003

(Continued)

OTHER PUBLICATIONS

D.A. Wiegandt et al. "High-performance OFDM via carrier interferometry," in Proc. IEEE Int. Conf. 3$^{rd}$ -Generation Wireless and Beyond, 3Gwireless '01, San Francisco, CA, 2001, pp. 404-409.

(Continued)

*Primary Examiner*—Chi H Pham
*Assistant Examiner*—Alexander Boakye
(74) *Attorney, Agent, or Firm*—Harness, Dickey & Pierce, P.L.C.

(57) ABSTRACT

The transmitter of one embodiment of the present invention includes: a S/P section for converting original serial data to parallel data which will correspond to a plurality of subcarriers; and a second IFFT section for converting the parallel data from the frequency domain to the time domain. The transmitter includes, between the S/P section and the second IFFT section, a first IFFT section for modulating the plurality of subcarriers using elements of a matrix derived from an expression for Inverse Discrete Fourier Transform involving time domain signal levels and frequency domain signal levels. The configuration enables CI and PO-CI to be implemented on transmitters and receivers with a simple configuration.

18 Claims, 20 Drawing Sheets

U.S. PATENT DOCUMENTS

2004/0086027 A1* 5/2004 Shattil .................. 370/208
2007/0009061 A1 1/2007 Kaku et al.

FOREIGN PATENT DOCUMENTS

| EP | 1 271 873 | 12/2007 |
|---|---|---|
| JP | 07-226724 | 8/1995 |
| JP | 2000-209183 | 7/2000 |
| JP | 2001-024617 | 1/2001 |
| JP | 2002-359606 | 12/2002 |
| JP | 2003-008535 | 1/2003 |

OTHER PUBLICATIONS

D.A. Wiegandt et al. "Overcoming Peak-to-average power ratio issues in OFDM via carrier interferometry codes," in Proc. IEEE Vehicle Technology Conf., Atlantic City, NJ, 2001, pp. 660-663.

Koichi Okada et al., "Data Henkan ni yoru OFDM Shingo no Ayamariritsu Tokusei no Kaizen", IEICE Communications Society Conference Koen Ronbunshu 2, Aug. 30, 1996, B-909, p. 394, and partial English translation thereof.

D.A. Wiegandt et al., "High-Throughput, High-Performance OFDM via Pseudo-Orthogonal Carrier Interferometry Spreading Codes", IEEE Transactions on Communications, vol. 51, No. 7, Jul. 2003, pp. 1123-1134.

Japanese Office Action dated Jan. 26, 2010 for JP Application No. 2007-529276.

Khoirul Anwar et al., "A New Design of Carrier Interferometry OFDM with FFT as Spreading Codes," Graduate School of Information Science, pp. 543-546.

Yusuke Miyamoto et al., "Maximum Likelihood Multi-User Detection for MC-CDMA Systems," IEICE Technical Report, 2006, pp. 161-166 (w/English translation).

Japanese Office Action dated Apr. 20, 2010 for JP Application No. 2007-529276.

* cited by examiner

FIG. 10

Computational Complexities of Generating CI Codes and Spreading Process

| FFT Points | CI/OFDM | | | Proposed CI-FFT/OFDM | | | Saving (%) | | |
|---|---|---|---|---|---|---|---|---|---|
| | Mul | Add | Mem | Mul | Add+Sub | Mem | Mul | Add+Sub | Mem |
| 16 | 256 | 225 | 256 | 32 | 64 | 16 | 85.8 | 71.6 | 93.8 |
| 32 | 1024 | 961 | 1024 | 80 | 160 | 32 | 91.7 | 83.4 | 96.9 |
| 64 | 4096 | 3969 | 4096 | 192 | 384 | 64 | 95.2 | 90.3 | 98.4 |
| 128 | 16384 | 16129 | 16384 | 448 | 896 | 128 | 97.2 | 94.4 | 99.2 |
| 256 | 65536 | 65025 | 65536 | 1024 | 2048 | 256 | 98.4 | 96.4 | 99.6 |
| 512 | 262144 | 261121 | 262144 | 2304 | 4608 | 512 | 99.1 | 98.2 | 99.8 |
| 1024 | 1048576 | 1046529 | 1048576 | 5120 | 10240 | 1024 | 99.5 | 99.0 | 99.9 |
| $N$ | $(N-1) \times (N-1)$ | $(N-1) \times (N)$ | $N \times N$ | $N/2 \log_2(N)$ | $N \log_2(N)$ | $N$ | | | |

Mul = multiplication, Add = Addition, Sub = subtraction, Mem = memory, FFT with radix-2

FIG. 13

Computational Complexities of Generating PO-CI Codes and Its Spreading Process

| FFT Points | PO-CI/OFDM | | | Proposed CI-FFT/OFDM | | | Save (%) | | |
|---|---|---|---|---|---|---|---|---|---|
| | Mul | Add | Mem | Mul | Add+Sub | Mem | Mul | Add+Sub | Mem |
| 16 | 512 | 466 | 512 | 80 | 144 | 48 | 84.4 | 69.1 | 90.6 |
| 32 | 2048 | 1954 | 2048 | 192 | 352 | 96 | 90.6 | 82.1 | 95.3 |
| 64 | 8192 | 8002 | 8192 | 448 | 832 | 192 | 94.5 | 89.6 | 97.7 |
| 128 | 32768 | 32386 | 32768 | 1024 | 1920 | 384 | 96.9 | 94.1 | 98.8 |
| 256 | 131072 | 130306 | 131072 | 2304 | 4352 | 768 | 98.2 | 96.7 | 99.4 |
| N | $2(N-1)(N-1)$ | $2(N-1)(N)+N$ | $2N*N$ | $2(N/2)\log_2(N)+N$ | $2N\log_2(N)+N$ | $2N+N$ | | | |

Mul = multiplication, Add = Addition, Sub = subtraction, Mem = memory, FFT with radix-2

$$CI_k = \{e^{j(2\pi/N) \cdot 0 \cdot k}, e^{j(2\pi/N) \cdot 1 \cdot k}, e^{j(2\pi/N) \cdot 2 \cdot k}, \ldots, e^{j(2\pi/N) \cdot (N-1) \cdot k}\}$$

TRANSMITTER AND RECEIVER

TECHNICAL FIELD

The present invention relates to CI-based transmitters and receivers.

BACKGROUND ART

Terrestrial digital TV broadcast is gaining popularity year after year and expected to give a nationwide coverage by 2010.

Transmitters and receivers for terrestrial digital TV broadcast have an antenna for transmission/reception of radio signals at about 600 MHz to about 1 GHz to about 2 GHz (overlapping or below the mobile phone band). Radio signals emitted from the antenna are reflected by buildings and mountains. The reflection can cause a phenomenon called multipath in which signals are delayed only temporarily, which in turn causes undesirable fading. If fading occurs frequently, it distorts frequency waveform and makes the antenna prone to error.

To prevent fading, the transmitters and receivers used currently for terrestrial digital TV broadcast employ OFDM (orthogonal frequency division multiplexing) in which, for example, a 6-mbps serial signal is converted to a parallel signal. This scheme divides a single carrier to, for example, 6000 carriers each of which is modulated. Therefore, fading, if it occurs, only affects the waveform of a particular carrier; it does not affect most carriers.

However, since OFDM requires multiple carriers, the electric power peaks of these carriers, when they come in phase, produce a very high electric power peak as shown in FIG. 20. This phenomenon is called "PAPR." Therefore, the maximum tolerance frequency is exceeded where electric power peaks are in phase like this.

Known transmitter/receiver technology of preventing the PAPR is CI-OFDM (Carrier Interferometry OFDM or simply "CI"). See non-patent documents 1, 2. CI restrains maximum peaks by shifting the phases of the electric power peaks of divided carriers. Using CI, the amplitude is reduced by a factor of ⅓ to ¼ as shown in FIG. 21. In FIG. 21, the vertical axis indicates voltage, and the horizontal axis indicates time.

Next, a specific implementation of CI-OFDM will be briefly explained. FIG. 22 shows a conventional CI transmitter. As shown in the figure, CI includes a serial-to-parallel converter section (S/P section; serial/parallel section) 150, a modulator section 151, an IFFT (Inverse Fast Fourier Transform) section 152, a guard interval input section (GI input section) 153, and an antenna 154. Data goes through these sections in this order.

The serial-to-parallel converter section 150 distributes incoming data to multiple carriers. Here, data is divided among four carriers. The modulator section 151 has a CI ($CI_1$, $CI_2$, $CI_3$, $CI_4$ . . . ) section arranged to form a 4×4 matrix and SUM sections each subsequent to a different row of CIs. Each CI is assigned a code set and modulates a carrier. Each SUM sums the carriers modulated by $CI_1$, $CI_2$, $CI_3$, and $CI_4$.

More specifically, the carrier with bit number 1 supplied from the serial-to-parallel converter section 150 is modulated by $CI_1$ and fed to SUM where the carrier stands by. The carrier with bit number 2 supplied from the serial-to-parallel converter section 150 is modulated by $CI_2$ and fed to SUM where the carrier stands by. Further, the carrier with bit number 3 supplied from the serial-to-parallel converter section 150 is modulated by $CI_3$ and fed to SUM where the carrier stands by. The carrier with bit number 4 supplied from the serial-to-parallel converter section 150 is modulated by $CI_4$ and fed to SUM where the carrier is summed with the standing-by carriers.

The sum signal is subjected to an Inverse Fast Fourier Transform by IFFT 152. The GI input section 153 feeds GI to the signal. The resultant signal is sent out from the antenna 154.

The CIk code set for the modulation of bit number k is given by Equation 1:

$$CI_k = \{e^{j(2\pi/N)\cdot 0\cdot k}, e^{j(2\pi/N)\cdot 1\cdot k}, e^{j(2\pi/N)\cdot 2\cdot k}, \ldots, e^{j(2\pi/N)\cdot(N-1)\cdot k}\} \quad \text{[Equation 1]}$$

Each element in Equation 1 indicates a code set. When CI is a N×N matrix, its code set is given by Equation 2:

$$CI_{N \times N} = \begin{pmatrix} 1 & 1 & \ldots & 1 & 1 \\ 1 & e^{j\frac{2\pi}{N}1\cdot 1} & \ldots & e^{j\frac{2\pi}{N}(N-2)\cdot 1} & e^{j\frac{2\pi}{N}(N-1)\cdot 1} \\ \vdots & \vdots & \ddots & \vdots & \vdots \\ 1 & e^{j\frac{2\pi}{N}1\cdot(N-2)} & \ldots & e^{j\frac{2\pi}{N}(N-2)\cdot(N-2)} & e^{j\frac{2\pi}{N}(N-1)\cdot(N-2)} \\ 1 & e^{j\frac{2\pi}{N}1\cdot(N-1)} & \ldots & e^{j\frac{2\pi}{N}(N-2)\cdot(N-1)} & e^{j\frac{2\pi}{N}(N-1)\cdot(N-1)} \end{pmatrix} \quad \text{[Equation 2]}$$

Another code set, PO-CI, is also known which has a greater capacity than CI. PO-CI includes the CI code set (first code set; see Equation 3) and an additional code set (second code set; see Equation 4).

$$C1_k = \{e^{j(2\pi/N)\cdot 0\cdot k}, e^{j(2\pi/N)\cdot 1\cdot k}, e^{j(2\pi/N)\cdot 2\cdot k}, \ldots, e^{j(2\pi/N)\cdot(N-1)\cdot k}\} \quad \text{[Equation 3]}$$

$$C2_k = \{e^{j(2\pi/N)\cdot 0\cdot k + 0\cdot \Delta\theta)}, e^{j(2\pi/N)\cdot 1\cdot k + 1\cdot \Delta\theta)}, \ldots, e^{j(2\pi/N)\cdot(N-1)\cdot k + (N-1)\cdot \Delta\theta)}\} \quad \text{[Equation 4]}$$

The second code set is adapted so that it shows peak electric powers between adjacent peak electric powers of the first code set as shown in FIG. 23.

PO-CI boasts a double throughput of CI and smaller PAPR than CI.

However, the transmitters/receivers based on CI or PO-CI technology require complex calculations and are not easy to design. Such transmitters/receivers are theoretically possible, but not feasible yet. Therefore, no commercial products have been developed based on CI or PO-CI.

Non-patent Document 1: D. A. Wiegandt and C. R. Nassar, "High-performance OFDM via carrier interferometry," in Proc. IEEE Int. Conf. 3rd-Generation Wireless and Beyond, 3G Wireless '01, San Francisco, Calif., 2001, pp. 404-409

Non-patent Document 2: D. A. Wiegandt, C. R. Nassar, and Z. Wu, "Overcoming peak-to-average power ratio issues in OFDM via carrier interferometry codes," in Proc. IEEE Vehicle Technology Conf., Atlantic City, N.J., 2001, pp. 660-663

DISCLOSURE OF THE INVENTION

The present invention, conceived in view of the issues, has an objective of realizing a transmitter and receiver based on CI and PO-CI technology with a simple structure.

The transmitter of the present invention, to address the issues, includes: serial-to-parallel converter means for converting original serial data to parallel data which will correspond to a plurality of subcarriers; and first Inverse Fast Fourier Transform means for converting the parallel data from the frequency domain to the time domain. The transmitter includes, between the serial-to-parallel converter means and the first Inverse Fast Fourier Transform means, first modulator means for modulating the plurality of subcarriers using elements of a matrix derived from an expression for Inverse Discrete Fourier Transform involving time domain signal levels and frequency domain signal levels.

In the transmitter of the present invention, it is preferred if the expression is written $$s(n) = \frac{1}{\sqrt{N}} \sum_{k=0}^{N-1} S_k e^{j(2\pi/N) \cdot k \cdot n}, \quad \text{[Equation 5]}$$

$$n = 0, 1, 2, \ldots, N-1$$

where $S_k$ is a frequency domain signal, $e^{j(2\pi/N \cdot k \cdot n)}$ is a frequency component, $S(n)$ is a time domain signal, and k is a bit number. Therefore, Equation 5 represents a conversion from the frequency domain to the time domain.

In the transmitter of the present invention, it is preferred if the matrix is written $$IDFT_{N \times N} = \quad \text{[Equation 6]}$$

$$\frac{1}{\sqrt{N}} \begin{pmatrix} 1 & 1 & \cdots & 1 & 1 \\ 1 & e^{j\frac{2\pi}{N} 1 \cdot 1} & \cdots & e^{j\frac{2\pi}{N}(N-2) \cdot 1} & e^{j\frac{2\pi}{N}(N-1) \cdot 1} \\ \vdots & \vdots & \ddots & \vdots & \vdots \\ 1 & e^{j\frac{2\pi}{N} 1 \cdot (N-2)} & \cdots & e^{j\frac{2\pi}{N}(N-2)(N-2)} & e^{j\frac{2\pi}{N}(N-1)(N-2)} \\ 1 & e^{j\frac{2\pi}{N} 1 \cdot (N-1)} & \cdots & e^{j\frac{2\pi}{N}(N-2)(N-1)} & e^{j\frac{2\pi}{N}(N-1)(N-1)} \end{pmatrix}$$

As mentioned earlier, CI is theoretically implementable on a transmitter, but not so in a practical sense due to the complexity of calculation involved. That is why there have been no conventional transmitters on which CI is implemented.

To address this issue, the inventors have diligently worked and as a result, found that Equation 6, derived by rearranging Equation 5, is very similar to the equation for conventionally complex and difficult-to-implement CI. Equation 5 is a general, well-known mathematical expression for IDFT (Inverse Discrete Fourier Transform) and can be readily evaluated using existing IFFT software (called CI-IFFT). In other words, conventional CI computation involves numerous calculations and difficult to implement in practice; the adoption of IFFT dramatically reduces the required number of calculations.

Therefore, a transmitter is readily realized capable of implementing conventionally infeasible CI.

In the transmitter of the present invention, it is preferred if: the matrix is made up of two matrices; the first modulator means includes second modulator means and third modulator means; and the transmitter further includes a separator after the third modulator means.

In the transmitter of the present invention, it is preferred if the two matrices are written $$\begin{pmatrix} 1 & 1 & \cdots & 1 & 1 \\ 1 & e^{j\frac{2\pi}{N} 1 \cdot 1} & \cdots & e^{j\frac{2\pi}{N}(N-2) \cdot 1} & e^{j\frac{2\pi}{N}(N-1) \cdot 1} \\ \vdots & \vdots & \ddots & \vdots & \vdots \\ 1 & e^{j\frac{2\pi}{N} 1 \cdot (N-2)} & \cdots & e^{j\frac{2\pi}{N}(N-2)(N-2)} & e^{j\frac{2\pi}{N}(N-1)(N-2)} \\ 1 & e^{j\frac{2\pi}{N} 1 \cdot (N-1)} & \cdots & e^{j\frac{2\pi}{N}(N-2)(N-1)} & e^{j\frac{2\pi}{N}(N-1)(N-1)} \end{pmatrix} \quad \text{[Equation 7]}$$

-continued $$\begin{pmatrix} 1 & e^{j\left(\frac{2\pi}{N}(N+0)\cdot 1 + \frac{\pi}{N} \cdot 1\right)} & \cdots & e^{j\left(\frac{2\pi}{N}(N+0)(N-1) + \frac{\pi}{N} \cdot (N-1)\right)} \\ 1 & e^{j\left(\frac{2\pi}{N}(N+1)\cdot 1 + \frac{\pi}{N} \cdot 1\right)} & \cdots & e^{j\left(\frac{2\pi}{N}(N+1)(N-1) + \frac{\pi}{N} \cdot (N-1)\right)} \\ \vdots & \vdots & \ddots & \vdots \\ 1 & e^{j\left(\frac{2\pi}{N}(2N-2)\cdot 1 + \frac{\pi}{N} \cdot 1\right)} & \cdots & e^{j\left(\frac{2\pi}{N}(2N-2)(N-1) + \frac{\pi}{N} \cdot (N-1)\right)} \\ 1 & e^{j\left(\frac{2\pi}{N}(2N-1)\cdot 1 + \frac{\pi}{N} \cdot 1\right)} & \cdots & e^{j\left(\frac{2\pi}{N}(2N-1)(N-1) + \frac{\pi}{N} \cdot (N-1)\right)} \end{pmatrix}$$

and
the separator is given by an expression:

$$e^{j\frac{\pi}{N} \cdot n} \quad \text{[Equation 8]}$$

With the configuration, a transmitter is readily realized which includes PO-CI which in turn includes two pieces of modulator means.

The receiver of the present invention includes: first Fast Fourier Transform means for converting original data from the time domain to the frequency domain; and parallel-to-serial converter means for converting, to serial data, parallel data which will correspond to a plurality of subcarriers supplied from the first Fast Fourier Transform means. The receiver is characterized in that it includes, between the first Fast Fourier Transform means and the parallel-to-serial converter means, the fourth modulator means for modulating the plurality of subcarriers using elements of a matrix derived from an expression for Discrete Fourier Transform involving time domain signal levels and frequency domain signal levels.

In the receiver of the present invention, it is preferred if the expression is written $$s(n) = \frac{1}{\sqrt{N}} \sum_{k=0}^{N-1} S_k e^{-j(2\pi/N) \cdot k \cdot n}, \quad \text{[Equation 9]}$$

$$n = 0, 1, 2, \ldots, N-1$$

where $s(n)$ is a time domain signal, $S_k$ is a frequency domain signal, and k is a bit number.

In the receiver of the present invention, it is preferred if the matrix is written $$DFT_{N \times N} = \frac{1}{\sqrt{N}} \quad \text{[Equation 10]}$$

$$\begin{pmatrix} 1 & 1 & \cdots & 1 & 1 \\ 1 & e^{-j\frac{2\pi}{N} 1 \cdot 1} & \cdots & e^{-j\frac{2\pi}{N}(N-2) \cdot 1} & e^{-j\frac{2\pi}{N}(N-1) \cdot 1} \\ \vdots & \vdots & \ddots & \vdots & \vdots \\ 1 & e^{-j\frac{2\pi}{N} 1 \cdot (N-2)} & \cdots & e^{-j\frac{2\pi}{N}(N-2)(N-2)} & e^{-j\frac{2\pi}{N}(N-1)(N-2)} \\ 1 & e^{-j\frac{2\pi}{N} 1 \cdot (N-1)} & \cdots & e^{-j\frac{2\pi}{N}(N-2)(N-1)} & e^{-j\frac{2\pi}{N}(N-1)(N-1)} \end{pmatrix}$$

As mentioned earlier, CI is theoretically implementable on a receiver, but not so in a practical sense due to the complexity of calculation involved. That is why there have been no conventional receivers on which CI is implemented.

To address this issue, the inventors have diligently worked and as a result, found that Equation 10, derived by rearranging Equation 9, is very similar to the equation for conventionally complex and difficult-to-implement CI. Equation 9 is a general, well-known mathematical equation for DFT (Discrete Fourier Transform) and can be readily evaluated using existing FFT software (called CI-FFT).

Therefore, a receiver is readily realized capable of implementing conventionally infeasible CI.

In the receiver of the present invention, it is preferred if the fourth modulator means is second Fast Fourier Transform means for converting data from the time domain to the frequency domain. The matrix is made up of two matrices. The fourth modulator means includes fifth modulator means and sixth modulator means; and the receiver further includes a separator before the sixth modulator means.

In the receiver of the present invention, it is preferred if the two matrices are written $$\begin{pmatrix} 1 & 1 & \cdots & 1 & 1 \\ 1 & e^{-j\frac{2\pi}{N} 1 \cdot 1} & \cdots & e^{-j\frac{2\pi}{N}(N-2) \cdot 1} & e^{-j\frac{2\pi}{N}(N-1) \cdot 1} \\ \vdots & \vdots & \ddots & \vdots & \vdots \\ 1 & e^{-j\frac{2\pi}{N} 1 \cdot (N-2)} & \cdots & e^{-j\frac{2\pi}{N}(N-2)(N-2)} & e^{-j\frac{2\pi}{N}(N-1)(N-2)} \\ 1 & e^{-j\frac{2\pi}{N} 1 \cdot (N-1)} & \cdots & e^{-j\frac{2\pi}{N}(N-2)(N-1)} & e^{-j\frac{2\pi}{N}(N-1)(N-1)} \end{pmatrix}$$ [Equation 11]

$$\begin{pmatrix} 1 & e^{-j\left(\frac{2\pi}{N}(N+0) \cdot 1+\frac{\pi}{N} \cdot 1\right)} & \cdots & e^{-j\left(\frac{2\pi}{N}(N+0)(N-1)+\frac{\pi}{N}(N-1)\right)} \\ 1 & e^{-j\left(\frac{2\pi}{N}(N+1) \cdot 1+\frac{\pi}{N} \cdot 1\right)} & \cdots & e^{-j\left(\frac{2\pi}{N}(N+1)(N-1)+\frac{\pi}{N}(N-1)\right)} \\ \vdots & \vdots & \ddots & \vdots \\ 1 & e^{-j\left(\frac{2\pi}{N}(2N-2) \cdot 1+\frac{\pi}{N} \cdot 1\right)} & \cdots & e^{-j\left(\frac{2\pi}{N}(2N-2)(N-1)+\frac{\pi}{N}(N-1)\right)} \\ 1 & e^{-j\left(\frac{2\pi}{N}(2N-1) \cdot 1+\frac{\pi}{N} \cdot 1\right)} & \cdots & e^{-j\left(\frac{2\pi}{N}(2N-1)(N-1)+\frac{\pi}{N}(N-1)\right)} \end{pmatrix}$$

and
the separator is given by an expression:

$$e^{-j\frac{\pi}{N} \cdot n}$$ [Equation 12]

With the configuration, a receiver is readily realized which includes PO-CI which in turn includes two pieces of modulator means.

BRIEF DESCRIPTION OF DRAWINGS

FIG. 10 shows that the receiver shown in FIG. 9 allows for simple design of CI.

FIG. 13 shows that the receiver shown in FIG. 12 allows for simple design of PO-CI when compared to conventional technology.

REFERENCE NUMERALS

1 Serial-to-parallel Converter Section (Serial-to-parallel Converter Means)
2 First IFFT Section (First Modulator Means; Second Inverse Fast Fourier Transform Means)
3 Second IFFT Section (First Inverse Fast Fourier Transform Means)
71 First FFT Section (First Fast Fourier Transform Means)
72 Second FFT Section (Fourth Modulator Means)
73 Parallel-to-serial Converter Section (Parallel-to-serial Converter Means)
78 Serial-to-parallel Converter Section (Serial-to-parallel Converter Means)
79 Third IFFT Section (Second Modulator Means)
80 Fourth IFFT Section (Third Modulator Means)
81 Separator
84 Fifth IFFT Section (First Inverse Fast Fourier Transform Means)
89 Third FFT Section (First Fast Fourier Transform Means)
90 Separator
91 Fourth FFT Section (Fifth Modulator Means)
92 Fifth FFT Section (Sixth Modulator Means)
93 Parallel-to-serial Converter Section (Parallel-to-serial Converter Means)

BEST MODE FOR CARRYING OUT THE INVENTION

An embodiment of the present invention will be described in reference to figures.

Figure 1:
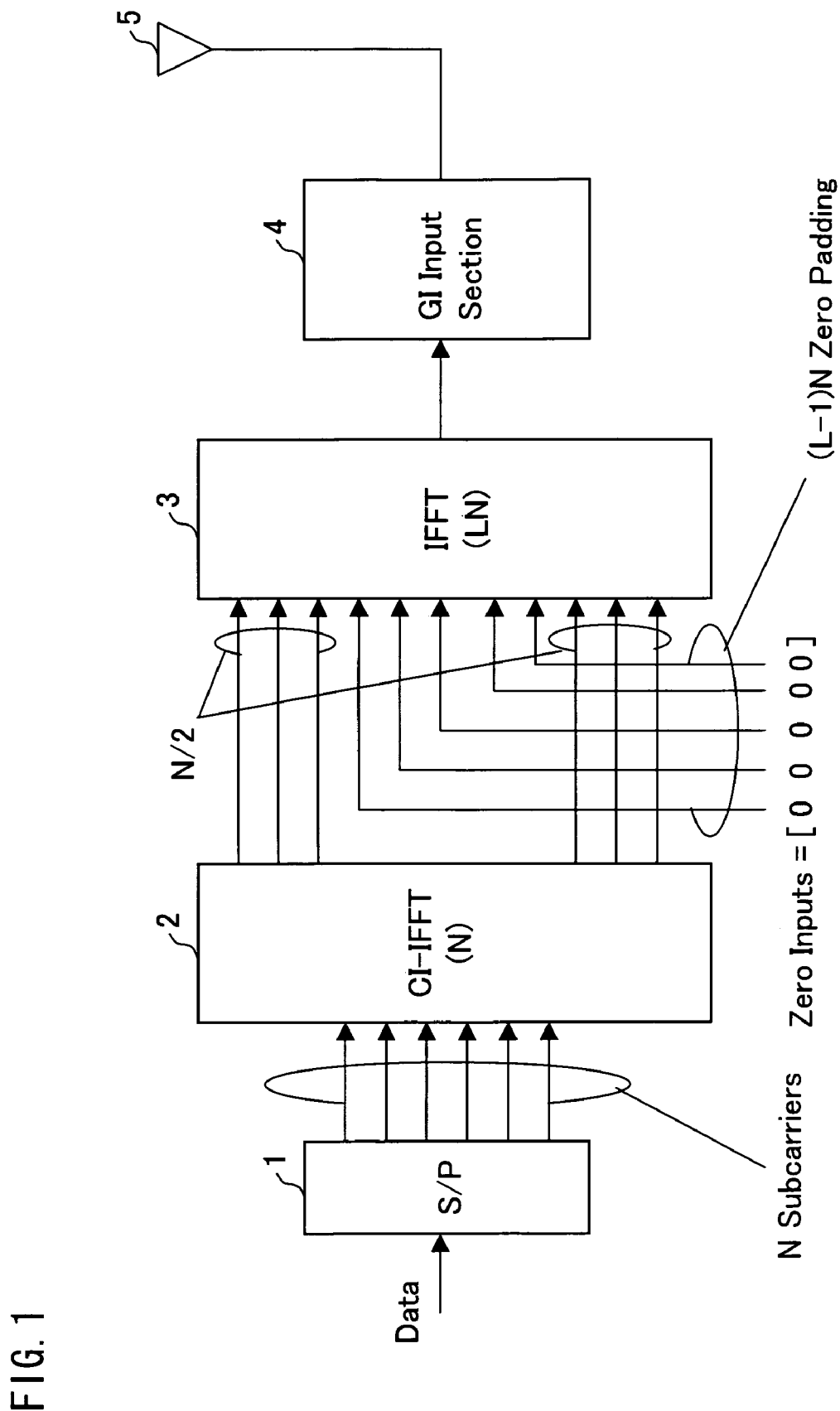
FIG. 1 is a block diagram schematically illustrating a structure of a transmitter in accordance with an embodiment of the present invention.

A terrestrial digital TV transmitter ("transmitter") of the present embodiment includes, as shown in FIG. 1, a serialto-parallel converter section (S/P section; serial/parallel section; serial-to-parallel converter means) 1, a first IFFT (Inverse Fast Fourier Transform; "CI (Carrier Interferometry)-IFFT") section (first modulator means; second Inverse Fast Fourier Transform means) 2, a second IFFT section (first Inverse Fast Fourier Transform means) 3, a guard interval input section (GI (Guard Interval) input section) 4, and an antenna 5. Data goes through these sections in this order. "CI-IFFT" is a term the inventors coined for convenience.

The description here assumes that the transmitter is designed for terrestrial digital television. Aside from that, the transmitter may be used for other purposes including in mobile terminals and PC (Personal Computer) cards. This is also true with the receiver which will be detailed later (see FIG. 9).

The S/P section 1 QPSK-modulates or QAM-modulates incoming data for serial-to-parallel conversion (that is, distributes incoming data (original data) among N subcarriers). The first IFFT section 2 generates a CI code set (elements) and modulates the subcarriers by spreading the CI code set across the subcarriers, to output data in two groups each designated for a set of N/2 subcarriers.

The second IFFT section 3 converts signals from the frequency domain to the time domain. The second IFFT section 3 receives, apart from the signals from the first IFFT section 2, (L−1)N zeros [00000] ("–padding") for oversampling and guard band between the sets of N/2 subcarriers. L is an oversampling factor. Now it is clear that the size of IFFT section 3 is larger than the size of IFFT section 2(for CI).

Next will be described the most important part of the present invention.

The most important part of the present invention which will be described here is the first IFFT section 2. The first IFFT section 2 has functions equivalent to CI (detailed later). Conventional transmitters include no first IFFT section 2. Ideally, CI should be provided where the first IFFT section 2 is disposed. As already mentioned, however, it is impossible to actually provide CI because that would require highly complex calculation.

Equation 13 is a general expression for Inverse Discrete Fourier Transform (IDFT) that is well known in mathematics. Inverse Discrete Fourier Transform is used to convert data in the frequency domain to data in the time domain.

$$s(n) = \frac{1}{\sqrt{N}} \sum_{k=0}^{N-1} S_k e^{j(2\pi/N) \cdot k \cdot n}, \quad n = 0, 1, 2, \ldots, N-1 \qquad \text{[Equation 13]}$$

where s(n) is a time domain signal, Sk is a frequency domain signal, and k is a carrier number (bit number). Equation 13 can be rewritten in matrix form as a set of bit numbers k (=1, 2, 3, ... (N−1)) as in Equation 14.

$$IDFT_{N \times N} = \frac{1}{\sqrt{N}} \begin{pmatrix} 1 & 1 & \cdots & 1 & 1 \\ 1 & e^{j\frac{2\pi}{N} 1 \cdot 1} & \cdots & e^{j\frac{2\pi}{N}(N-2) \cdot 1} & e^{j\frac{2\pi}{N}(N-1) \cdot 1} \\ \vdots & \vdots & \ddots & \vdots & \vdots \\ 1 & e^{j\frac{2\pi}{N} 1 \cdot (N-2)} & \cdots & e^{j\frac{2\pi}{N}(N-2) \cdot (N-2)} & e^{j\frac{2\pi}{N}(N-1) \cdot (N-2)} \\ 1 & e^{j\frac{2\pi}{N} 1 \cdot (N-1)} & \cdots & e^{j\frac{2\pi}{N}(N-2) \cdot (N-1)} & e^{j\frac{2\pi}{N}(N-1) \cdot (N-1)} \end{pmatrix} \qquad \text{[Equation 14]}$$

Note that Equation 14 is identical to Equation 2 described in Background Art except for the coefficient √n. Therefore, the first IFFT section 2 is capable of modulating multiple subcarriers using the elements of the matrix given by Equation 14 which in turn is derived from the equation involving time domain signal levels and frequency domain signal levels (Equation 13).

The fact that Equation 2 used in CI is practically identical to Equation 14 derived from IDFT (Equation 13) is discovered for the first time by the inventors after diligent work and endeavor. The fact leads to the following effects.

OFDM (Orthogonal Frequency Division Multiplexing) is accompanied, as mentioned earlier, by PAPR (Peak-to-Average Power Ratio) problems. PAPR refers to peaks which overlap and exceed a tolerable maximum frequency. To prevent PAPR from occurring, it was desirable to apply CI to OFDM. However, CI-OFDM needs complex calculation (thus complex computer circuitry and large memory); the technique is theoretically implementable on a computer, but yet to be successfully realized. No commercial products have been developed either.

To address the issues, the inventors have found that Equation 14 derived from IDFT (Equation 13) is practically identical to CI. At the risk of being repetitive, Equation 14 is obtained by rearranging Equation 13 which is mathematically mundane and handled easily using existent software. That makes it possible to implement conventionally unfeasible CI without complex calculation.

The inventors have diligently worked further and found that IFFT (Inverse Fast Fourier Transform), which is much simpler than IDFT, can be used to implement CI. FIG. 1 shows a transmitter in which CI is implemented by IFFT.

Equation 13 can be rewritten as Equation 15. For ease in description, a different symbol is used, and 1/√N is omitted.

$$f[n] = \sum_{k=0}^{N-1} F[n] e^{j\frac{2\pi}{N} kn} = \sum_{k=0}^{N-1} F[n] W_N^{kn} \qquad \text{[Equation 15]}$$

Rearranging Equation 15 into terms for even-numbered carrier numbers k and terms for odd-numbered carrier numbers k, Equation 16 is obtained.

$$f[n] = \sum_{m=0}^{\frac{N}{2}-1} F[2m] W_N^{2mn} + \sum_{m=0}^{\frac{N}{2}-1} F[2m+1] W_N^{(2m+1)n}, \qquad \text{[Equation 16]}$$

$$W_N^{2mn} = e^{j\frac{2\pi}{N}(2mn)} = e^{j\frac{2\pi}{N} mn} = W_{\frac{N}{2}}^{mn}$$

Further rearranging Equation 16, Equation 17 is obtained.

$$f[n] = \sum_{m=0}^{\frac{N}{2}-1} F[2m] W_{\frac{N}{2}}^{mn} + W_N^n \sum_{m=0}^{\frac{N}{2}-1} F[2m+1] W_{\frac{N}{2}}^{mn} \qquad \text{[Equation 17]}$$

Replacing the summations in Equation 17 with g[n] and h[n] respectively, we obtain Equation 18:

$$f[n] = g[n] + W_N^n h[n] \qquad \text{[Equation 18]}$$

From Equation 15, letting $W_8^1 = e^{j(2\pi/8)} = e^{j45°} = (1+j)/\sqrt{2} = a$, we obtain:

$a^2 = j$ $a^3 = ja = -a^*$ $a^4 = -1$
$a^5 = -a$
$a^6 = -j$
$a^7 = -ja = a$
$a^8 = 1$

Therefore,
$W_8^4 = -W_8^0$
$W_8^5 = -W_8^1$
$W_8^6 = -W_8^2$
$W_8^7 = -W_8^3$

Hence, we obtain Table 1 which demonstrates that IFFT (FFT) which requires calculations of $W_8^0$ to $W_8^3$ involves simpler calculation than IDFT (DFT) which requires calculations of $W_8^0$ to $W_8^7$. Table 1 also shows that DFT=CI.

TABLE 1

Even input: F[0], F[2], F[4], F[6]
Odd input: F[1], F[3], F[5], F[7]
From (4) we can write:
f[0] = g[0] + $W_8^0$.h[0]
f[1] = g[1] + $W_8^1$.h[1]
f[2] = g[2] + $W_8^2$.h[2]
f[3] = g[3] + $W_8^3$.h[3]
f[4] = g[4] + $W_8^4$.h[4] = g[0] − $W_8^0$.h[0]
f[5] = g[5] + $W_8^5$.h[5] = g[1] − $W_8^1$.h[1]
f[6] = g[6] + $W_8^6$.h[6] = g[2] − $W_8^2$.h[2]
f[7] = g[7] + $W_8^7$.h[7] = g[3] − $W_8^3$.h[3]

may be replaced with IDFT because CI can be implemented far more easily than in conventional transmitters. IDFT or DFT may substitute similarly in receivers as will be detailed later using IFFT or FFT similarly (see FIG. 9).

Figure 2:
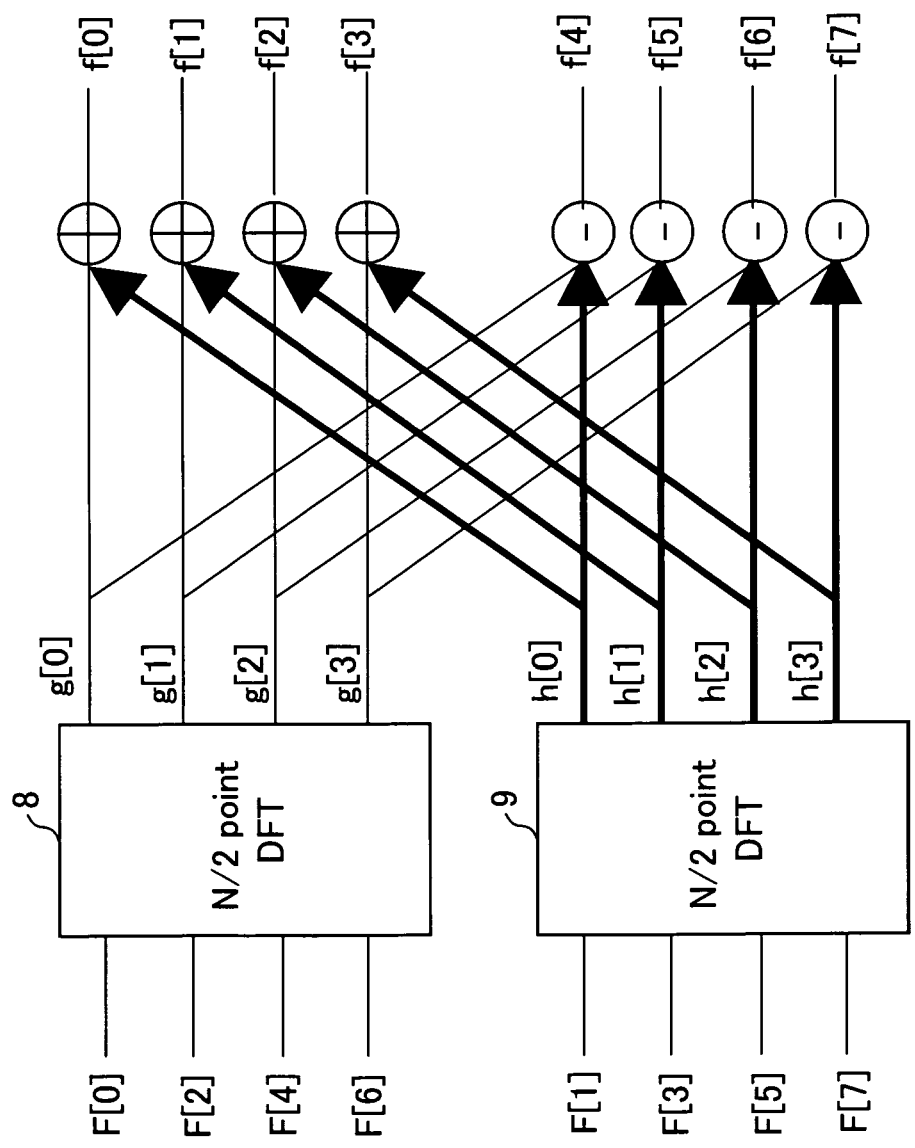
FIG. 2 is a diagrammatic representation of Table 1.

FIG. 2 is a diagrammatic representation of Table 1. In the figure, thin lines indicate an operation "×1," and thick lines indicate an operation "×$W_8^n$." In addition, as shown in FIG. 2, the even inputs F[0], F[2], F[4], F[6] and the odd inputs F[1], F[3], F[5], F[7] are fed to respective DFTs 8, 9. The signals h[0], h[1], h[2], h[3] (i.e., outputs from the odd-number DFT 9) are each multiplied by $W_8^n$.

The signals g[0], g[1], g[2], g[3] (i.e., outputs from the even-input DFT 8) are added to the output signals from the odd-input DFT 9 to produce f[0], f[1], f[2], and f[3]. Meanwhile, the output signals from the odd-input DFT 9 are subtracted from the output signals from the even-input DFT 8 to produce f[4], f[5], f[6], and f[7].

Figure 3:
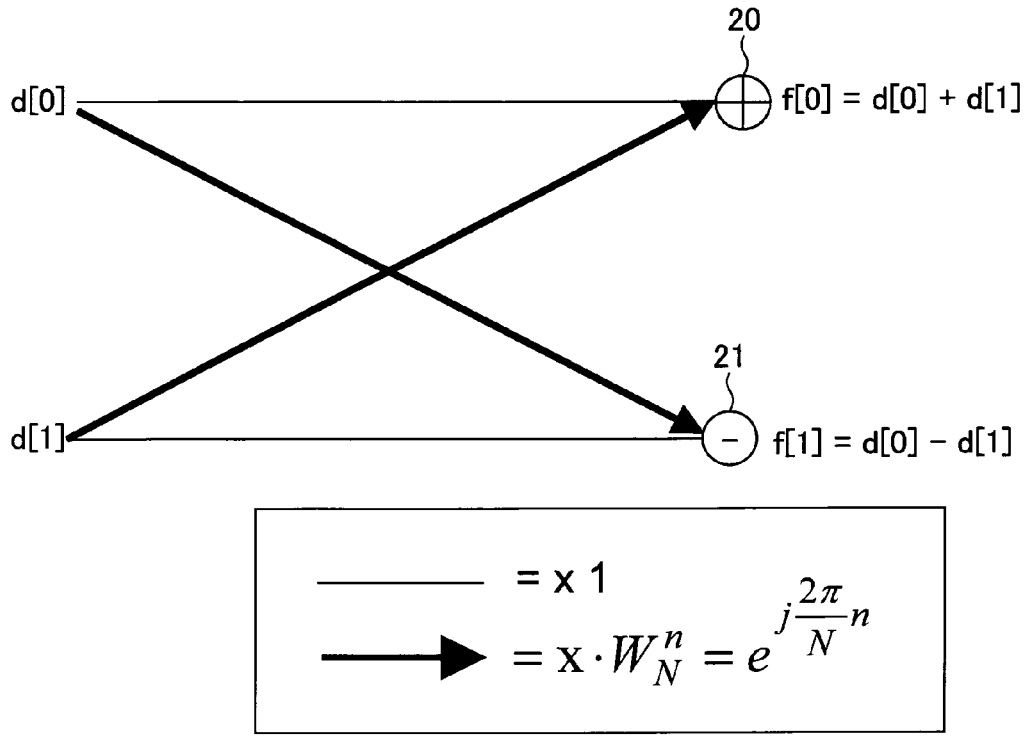
FIG. 3 is a schematic diagram of CI-IFFT workings used in a transmitter for N=2.

Next will be described, in reference to FIG. 3, the internal workings and data flow of the CI-IFFT (corresponding to the first IFFT section 2; see FIG. 1) implemented in a transmitter. The figure illustrates a case when N=2 (that is, two subcarriers). In the figure, thin lines indicate an operation ×1, and thick lines with arrow heads indicate an operation "×$W_N^n$ ($=e^{j(2\pi/N)n}$)."

The CI-IFFT, as shown in the figure, includes an adder 20 and a subtracter 21. The subcarriers supplied to the CI-IFFT are denoted by d[0] and d[1]. The adder 20 is disposed following an input section for the subcarrier d[0] in the CI-IFFT, whereas the subtracter 21 is disposed following an input section for the subcarrier d[1] in the CI-IFFT.

The bracketed numbers in "subcarriers d[0] and d[1]" indicate bit numbers (indices) here and throughout the rest of this document. The adder 20 adds the subcarrier d[0] to the subcarrier d[1] times $W_N^n$ ($=e^{j(2\pi/N)n}$) to derive f[0]. Meanwhile, the subtracter 21 subtracts the subcarrier d[1] from the subcarrier d[0] times $W_N^n$ ($=e^{j(2\pi/N)n}$) to derive f[1]. The CI-FFT then outputs f[0] and f[1] separately. In the current case, the CI-IFFT completes the calculation task by performing only one multiplication, one addition, and one subtraction. Thus, the CI is implemented through simpler calculations by far than conventional CI-OFDM.

Figure 4:
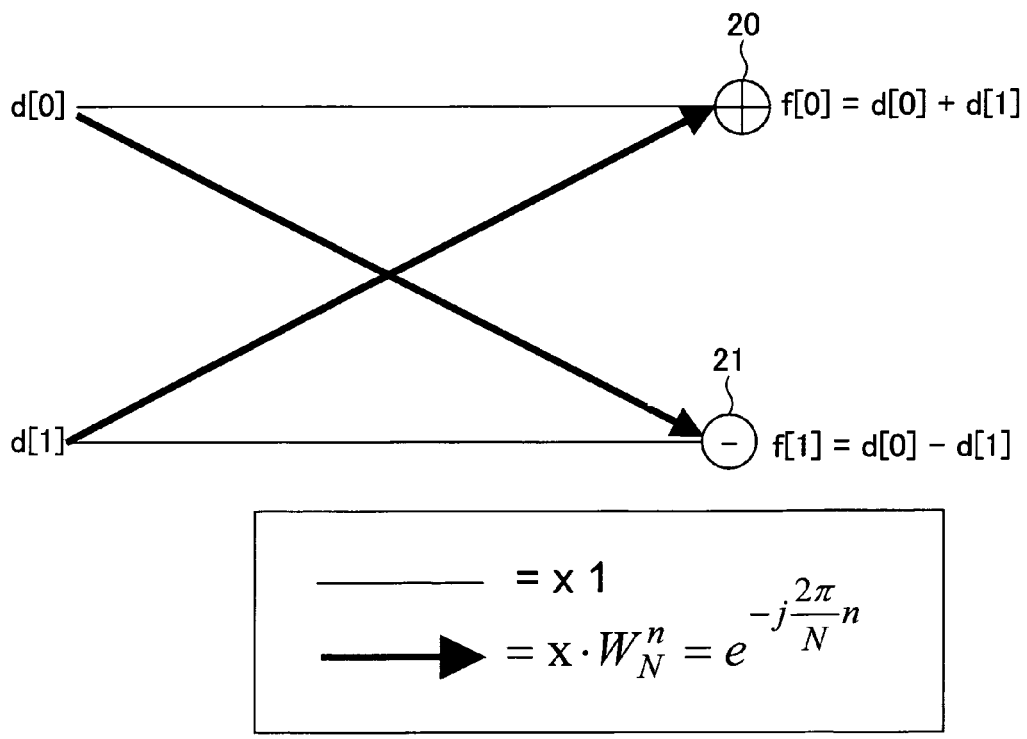
FIG. 4 is a schematic diagram of CI-IFFT workings used in a receiver for N=2.

Next will be described, in reference to FIG. 4, the internal workings and operation of the CI-FFT implemented in a receiver (detailed later; see FIG. 9). The description will discuss a case where N=2 again. In the figure, thin lines indicate an operation "×1," and thick lines with arrow heads indicate an operation "×$W_N^n$ ($=e^{-j(2\pi/N)n}$)." The CI-FFT also includes an adder 20 and a subtracter 21 as shown in the figure. The subcarriers supplied to the CI-FFT are denoted by d[0] and d[1]. The adder 20 is disposed following an input section for the subcarrier d[0] in the CI-FFT, whereas the subtracter 21 is disposed following an input section for the subcarrier [1] in the CI-FFT.

The adder 20 adds subcarrier d[0] to the subcarrier d[1] times $W_N^n$ ($=e^{j(2\pi/N)n}$) to derive f[0]. Meanwhile, the subtracter 21 subtracts the subcarrier d[1] from the subcarrier d[0] times $W_N^n$ ($=e^{j(2\pi/N)n}$) to derive f[1]. The CI-FFT then outputs f[0] and f[1] separately. In the current case, similarly to the CI-IFFT as a transmitter, the CI is implemented through simpler calculations by far than conventional CI-OFDM.

Next will be described, in reference to FIG. 5, the CI-IFFT implemented in a transmitter for N=4 (that is, four subcarriers). In the figure, thin lines indicate an operation "×1," whereas thick lines with arrow heads indicate an operation "×$W_N^n$ ($=e^{j(2\pi/N)n}$)." The CI-IFFT in this case includes a bit reverser 22, a first group of computing elements 23, and a second group of computing elements 33 arranged in this order along the flow of data as shown in the figure.

The subcarriers supplied to the CI-IFFT are denoted by d[0], d[1], d[2], and d[3]. The bit reverser 22 alters (reverses) the (data flow) paths of the subcarriers supplied to the CI-IFFT in accordance with the rules specified in Table 2.

TABLE 2

| index | Binary | Bit-reversed binary | Bit-reversed index |
| --- | --- | --- | --- |
| 0 | 00 | 00 | 0 |
| 1 | 01 | 10 | 2 |
| 2 | 10 | 01 | 1 |
| 3 | 11 | 11 | 3 |

Figure 5:
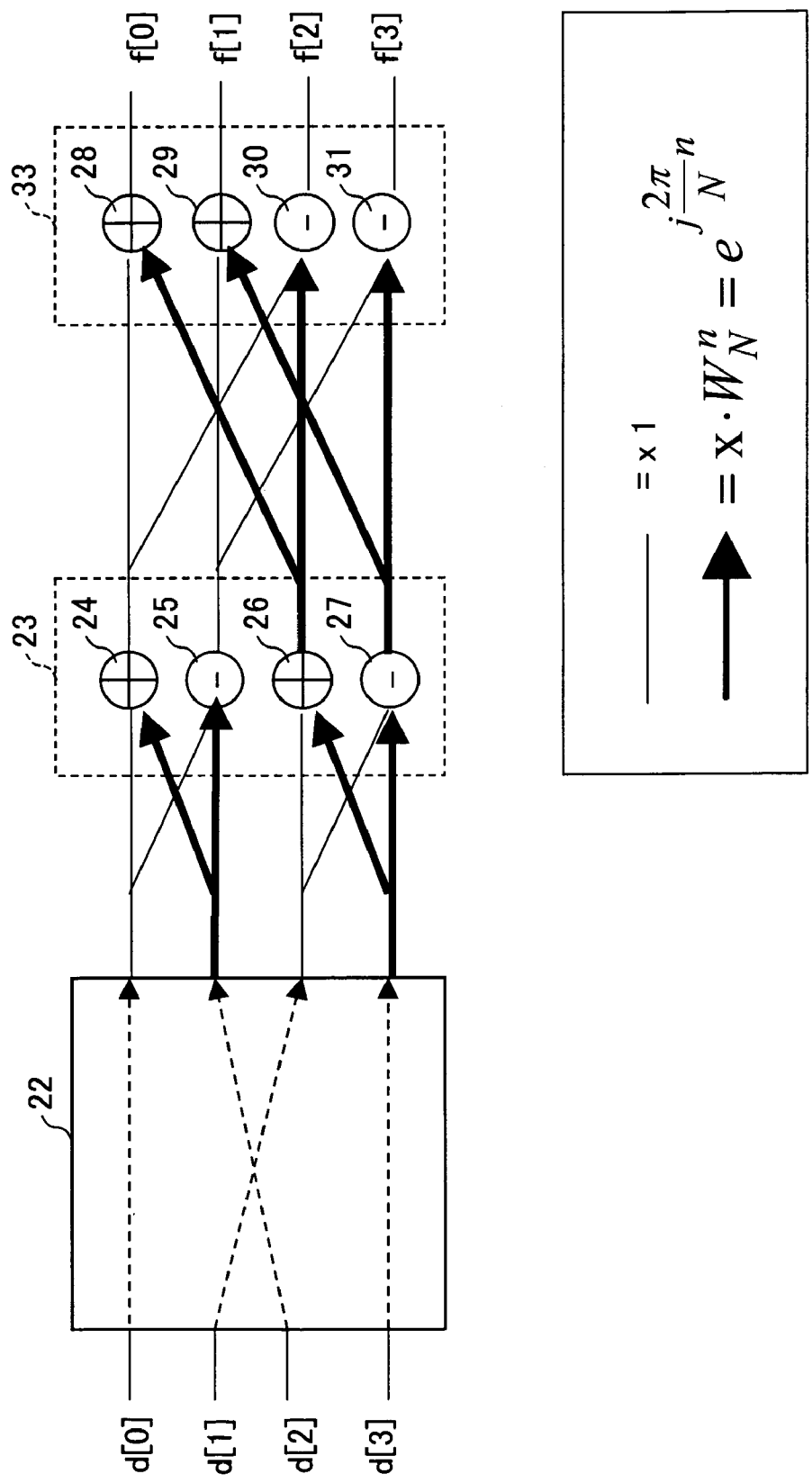
FIG. 5 is a schematic diagram of CI-IFFT workings used in a transmitter for N=4.

As shown in Table 2 and FIG. 5, the subcarriers d[1] and d[2] exchange their paths. The first group of computing elements 23 includes an adder 24, a subtracter 25, an adder 26, and a subtracter 27 disposed in this order in the direction from the input section for the subcarrier d[0] to the input section for the subcarrier d[3] in the CI-IFFT. The second group of computing elements 33 includes an adder 28, an adder 29, a subtracter 30, and a subtracter 31 disposed in this order in the direction from the input section for the subcarrier d[0] to the input section for the subcarrier d[3] in the CI-IFFT.

Next, a data flow will be described. For ease in description, $W_N^n$ ($=e^{j(2\pi/N)n}$) will be referred to as a rotation factor in the following.

The bit reverser 22 outputs the subcarrier d[0] and the subcarrier d[2] times the rotation factor to the adder 24 where they are added. The bit reverser 22 outputs the subcarrier d[0] and the subcarrier d[2] times the rotation factor to the subtracter 25 where they are subtracted (d[0]−d[2]).

The bit reverser 22 outputs the subcarrier d[1] and the subcarrier d[3] times the rotation factor to the adder 26 where they are added. The bit reverser 22 outputs the subcarrier d[1] and the subcarrier d[3] times the rotation factor to the subtracter 27 where they are subtracted (d[1]−d[3]).

Next, the output of the adder 24 and the output of the adder 26 times the rotation factor are supplied to the adder 28 where they are added to derive f[0]. The output of the subtracter 25 and the output of the subtracter 27 times the rotation factor are supplied to the adder 29 where they are added to derive f[1]. The output of the adder 24 and the output of the adder 26 times the rotation factor are supplied to the subtracter 30 where they are subtracted (Output of Adder 24–Output of Adder 26) to derive f[2].

The output of the subtracter 25 and the output of the subtracter 27 times the rotation factor are supplied to the subtracter 31 where they are subtracted (Output of Subtracter 25–Output of Subtracter 27) to derive f[3].

In the current case, the CI-IFFT completes the calculation task by performing only four multiplications, four additions, and four subtractions. Thus, the CI is implemented through simpler calculations by far than conventional CI-OFDM.

Figure 6:
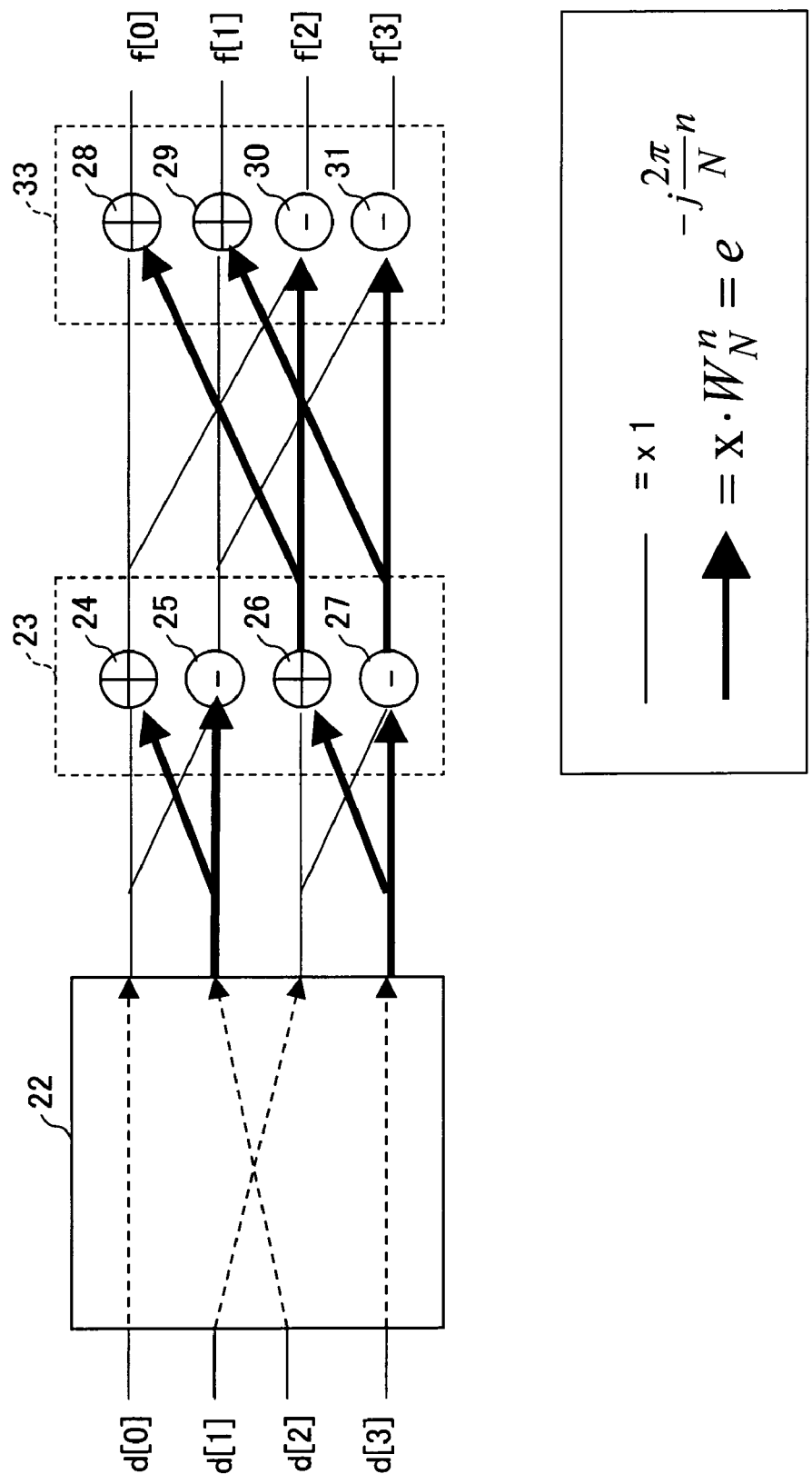
FIG. 6 is a schematic diagram of CI-IFFT workings used in a receiver for N=4.

FIG. 6 shows the internal workings and data flow of the CI-FFT for N=4. Description of the internal workings and data flow in the CI-FFT is omitted because it is only the internal operation of the CI-IFFT and the value of the rotation factor that are different, that is, only the rotation factor changes to $W_N^n (=e^{-j(2\pi/N)n})$.

Next will be described, in reference to FIG. 7, the internal workings and data flow of the CI-IFFT used in a transmitter for N=8 (that is, eight subcarriers). In the current case, the CI-IFFT includes a bit reverser 40, a first group of computing elements 41, a second group of computing elements 42, and a third group of computing elements 43 arranged in this order along the flow of data as shown in the figure. In the figure, thin lines indicate an operation "×1," whereas thick lines with arrow heads indicate an operation "$\times W_N^n (=e^{j(2\pi/N)n})$."

The subcarriers supplied to the CI-IFFT are denoted by d[0] to d[7]. The bit reverser 40 alters (reverses) the paths of the subcarriers supplied to the CI-IFFT in accordance with the rules specified in Table 3.

TABLE 3

| index | Binary | Bit-reversed binary | Bit-reversed index |
|---|---|---|---|
| 0 | 000 | 000 | 0 |
| 1 | 001 | 100 | 4 |
| 2 | 010 | 010 | 2 |
| 3 | 011 | 110 | 6 |
| 4 | 100 | 001 | 1 |
| 5 | 101 | 101 | 5 |
| 6 | 110 | 011 | 3 |
| 7 | 111 | 111 | 7 |
| ... | ... | ... | ... |

Figure 7:
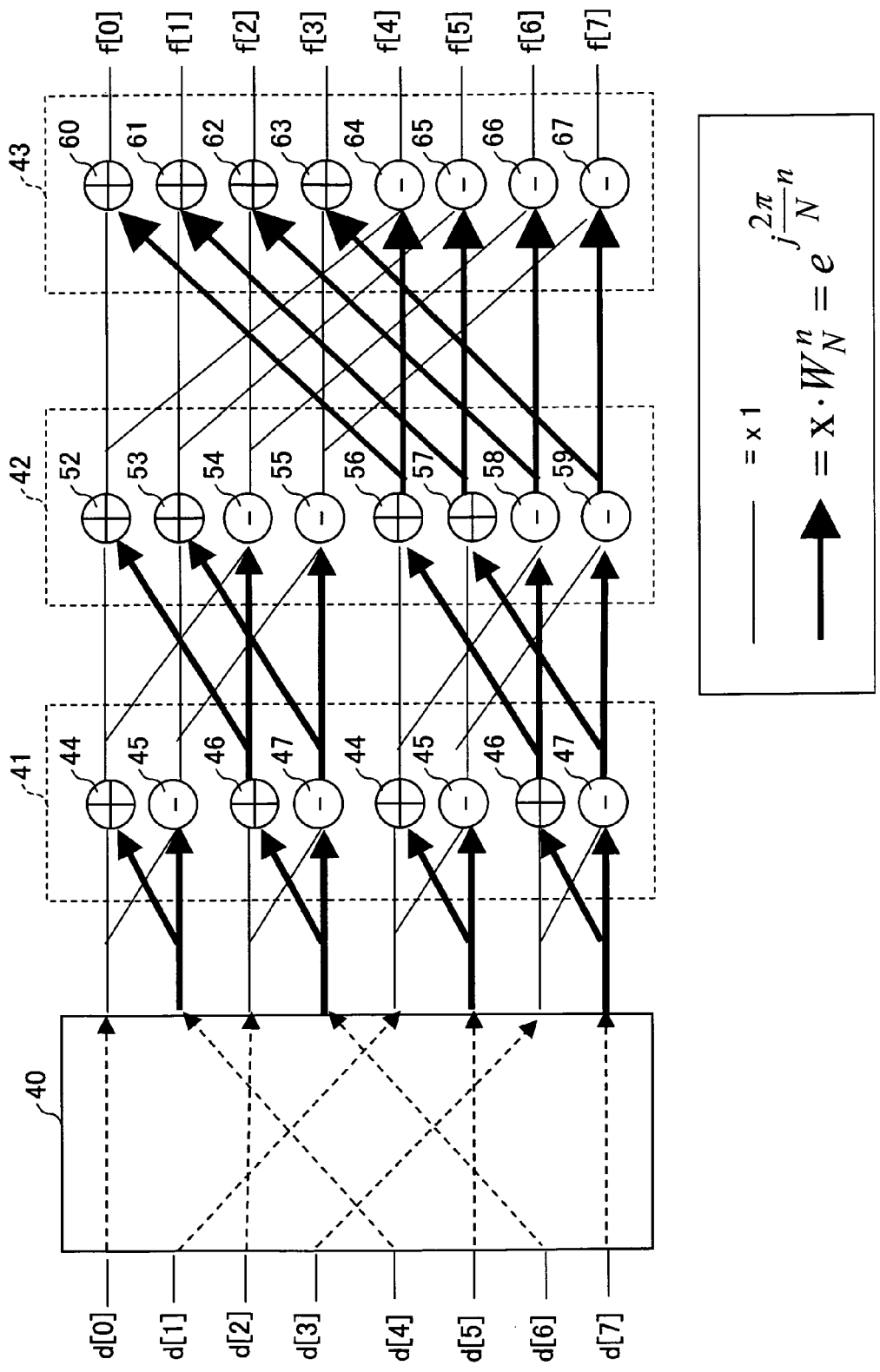
FIG. 7 is a schematic diagram of CI-IFFT workings used in a transmitter for N=8.

As shown in Table 3 and FIG. 7, the subcarriers d[2] and d[4] exchange their paths, and so do the subcarriers d[3] and d[6].

the first group of computing elements 41 includes an adder 44, a subtracter 45, an adder 46, a subtracter 47, an adder 48, a subtracter 49, an adder 50, and a subtracter 51 disposed in this order in the direction from the input section for the subcarrier d[0] to the input section for the subcarrier d[7] in the CI-IFFT. The second group of computing elements 42 includes an adder 52, an adder 53, a subtracter 54, a subtracter 55, an adder 56, an adder 57, a subtracter 58, and a subtracter 59 disposed in this order in the direction from the input section for the subcarrier d[0] to the input section for the subcarrier d[7] in the CI-IFFT. The third group of computing elements 43 includes an adder 60, an adder 61, an adder 62, an adder 63, a subtracter 64, a subtracter 65, a subtracter 66, and a subtracter 67 disposed in this order in the direction from the input section for the subcarrier d[0] to the input section for the subcarrier d[7] in the CI-IFFT.

Next, a data flow will be described. For ease in description, $W_N^n (=e^{j(2\pi/N)n})$ will be referred to as a rotation factor.

The CI-IFFT implemented in a transmitter for N=8 includes two CI-IFFTs for N=4 followed by a third group of computing elements 43. The outputs of either one of the two CI-IFFTs are multiplied by a rotation factor and supplied to the third group of computing elements 43. In the current case, the CI-IFFT completes the calculation task by performing only 12 multiplications, 12 additions, and 12 subtractions. Thus, the CI is implemented through simpler calculations by far than conventional CI-OFDM.

Figure 8:
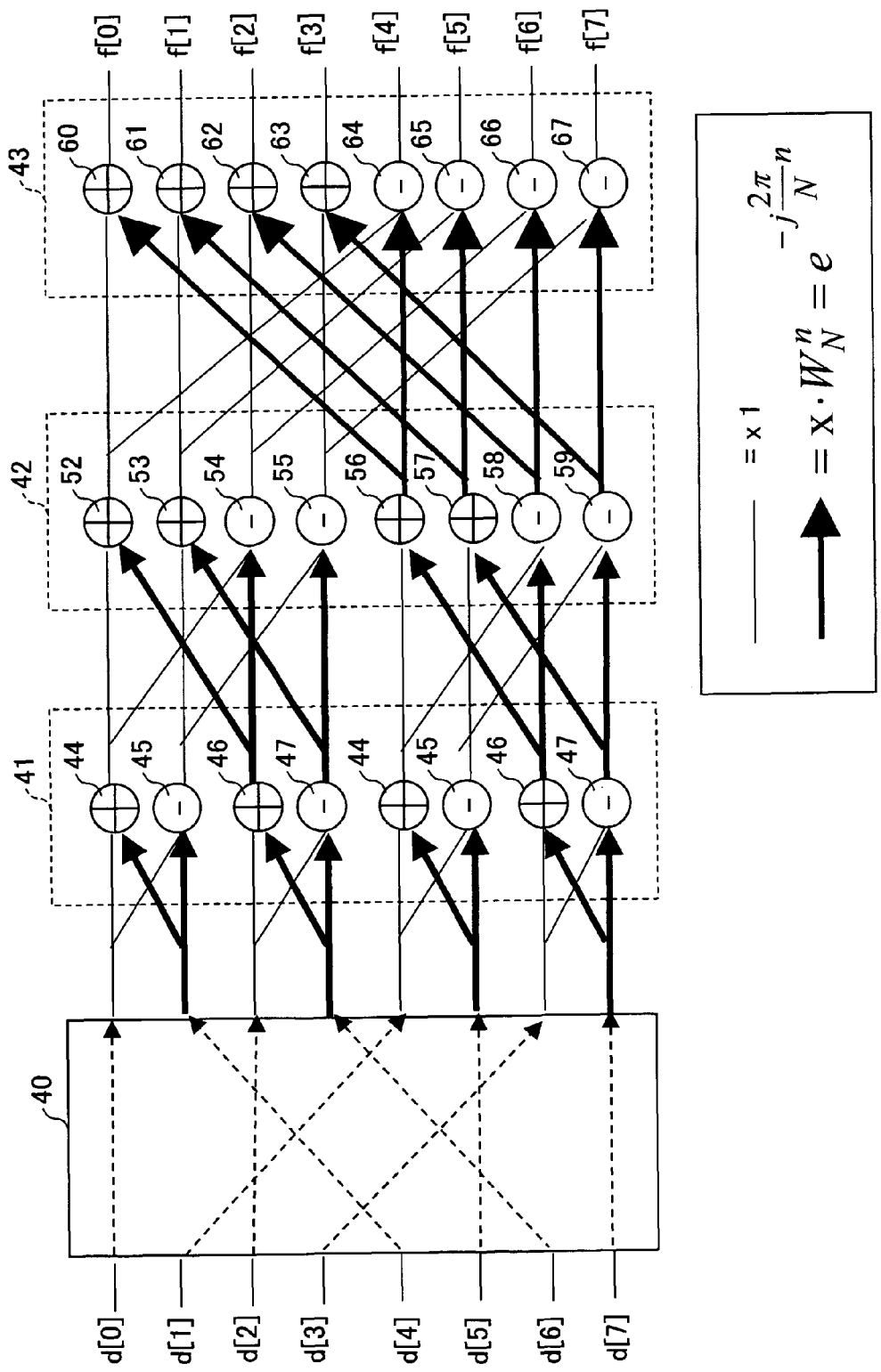
FIG. 8 is a schematic diagram of CI-IFFT workings used in a receiver for N=8.

FIG. 8 shows the internal workings and data flow of the CI-FFT implemented in a receiver for N=8. Description of the internal workings and data flow in the CI-FFT is omitted because it is only the internal operation of the CI-IFFT and the value of the rotation factor that are different, that is, only the rotation factor changes to $W_N^n (=e^{-j(2\pi/N)n})$.

The description so far has discussed transmitters for terrestrial digital television (see FIG. 1); CI is readily implemented similarly in receivers. FIG. 9 is a block diagram illustrating a terrestrial digital TV receiver.

The receiver includes an antenna 69, a guard removal section (GI removal section) 70, a first FFT (Fast Fourier Transform) section (first Fast Fourier Transform means) 71, a second FFT section (fourth modulator means) 72, and a parallel-to-serial converter section (P/S section; parallel/serial; parallel serial converter means) 73.

The antenna 69 receives external data (original data). The GI removal section 70 removes GI from the data fed from the antenna 69. The first FFT section 71 performs a Fast Fourier Transform on the data fed from the GI removal section 70 to convert the data from the time domain to the frequency domain. The outputs of the first FFT section 71 are divided into two groups each designated for a set of N/2 subcarriers. Signals between these two groups are disregarded. L is an oversampling factor.

The second FFT section 72 generates a CI code set (elements) and modulates the subcarriers by spreading the CI code set across the subcarriers, to output data. The P/S section 73 QPSK- or QAM-modulates the data for parallel-to-serial conversion.

The most important part of the configuration is the second FFT section 72 which performs equivalent functions to CI similarly to the first IFFT section 2. Thus, CI is implemented also on the receiver without complex calculation.

On a receiver, the CI is readily implemented using, in place of Equation 13, a matrix of Equation 20 below which is derived from Equation 19 representing a DFT (Discrete Fourier Transform).

$$s(n) = \frac{1}{\sqrt{N}} \sum_{k=0}^{N-1} S_k e^{-j(2\pi/N) \cdot k \cdot n}, \quad \text{[Equation 19]}$$

$$n = 0, 1, 2, \ldots, N-1$$

where s(n) is a time domain signal, $S_k$ is a frequency domain signal, and k is a bit number.

$$DFT_{N \times N} = \frac{1}{\sqrt{N}} \quad \text{[Equation 20]}$$

$$\begin{pmatrix} 1 & 1 & \cdots & 1 & 1 \\ 1 & e^{-j\frac{2\pi}{N} 1 \cdot 1} & \cdots & e^{-j\frac{2\pi}{N}(N-2) \cdot 1} & e^{-j\frac{2\pi}{N}(N-1) \cdot 1} \\ \vdots & \vdots & \ddots & \vdots & \vdots \\ 1 & e^{-j\frac{2\pi}{N} 1 \cdot (N-2)} & \cdots & e^{-j\frac{2\pi}{N}(N-2) \cdot (N-2)} & e^{-j\frac{2\pi}{N}(N-1) \cdot (N-2)} \\ 1 & e^{-j\frac{2\pi}{N} 1 \cdot (N-1)} & \cdots & e^{-j\frac{2\pi}{N}(N-2) \cdot (N-1)} & e^{-j\frac{2\pi}{N}(N-1) \cdot (N-1)} \end{pmatrix}$$

Figure 9:
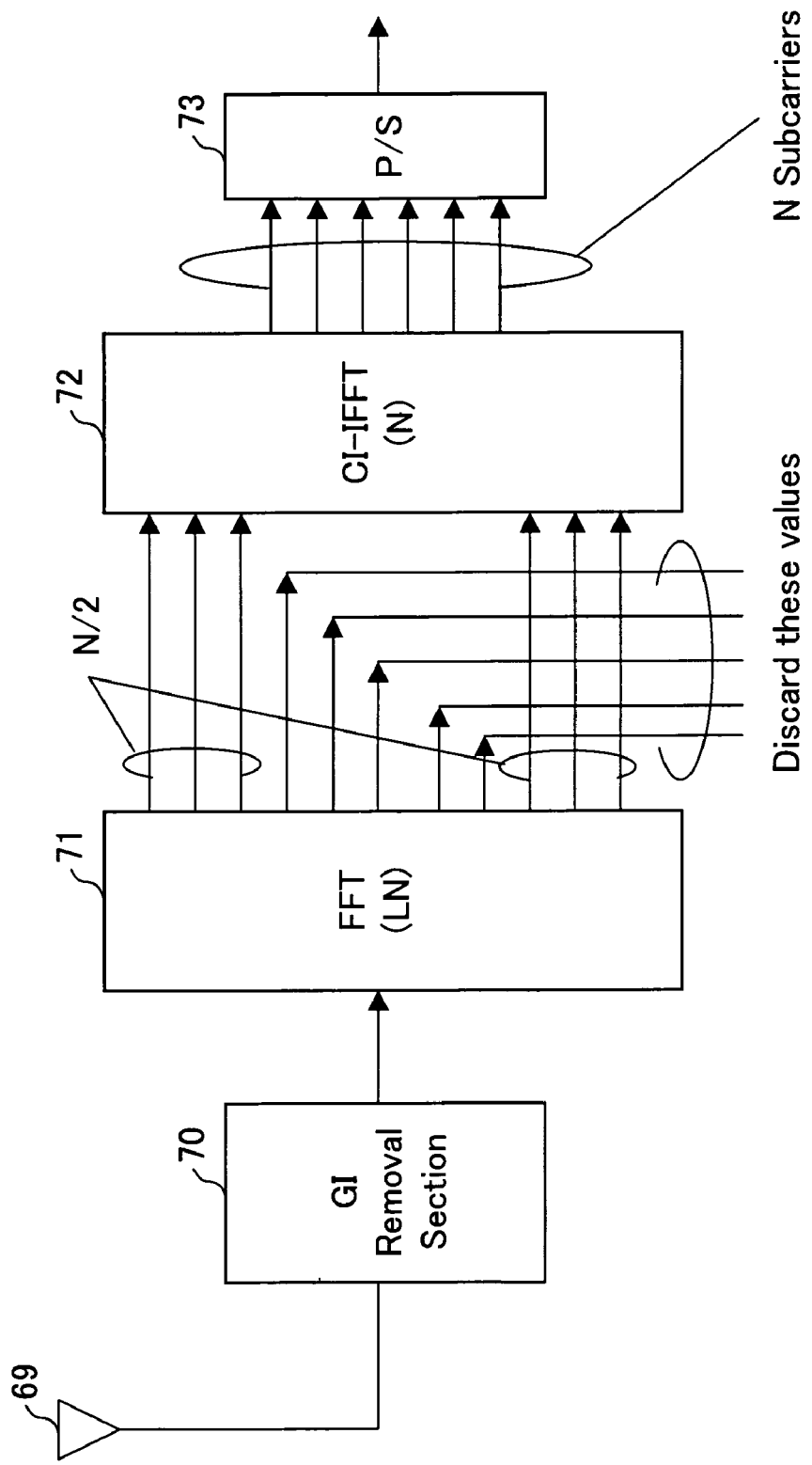
FIG. 9 is a block diagram schematically illustrating a structure of a receiver in accordance with an embodiment of the present invention.

FIG. 10 is a table showing that the receiver shown in FIG. 9 allows for simple design of CI. This is an example for a receiver. Similarly results are feasible, however, for a transmitter such as the one shown in FIG. 1. The figure demonstrates that the CI-FFT of the present invention requires far fewer multiplications, additions, and subtractions (calculations) and far less memory than conventional CI-OFDM.

Calculation using the conventional CI code set in Equation 2 needs (N−1)×(N−1) multiplications, (N−1)×N additions, and memory for N×N pieces of data. In contrast, the present embodiment does not calculates all rotation factors and needs only $N/2 \cdot \log_2(N)$ multiplications, $N\log_2(N)$ additions and subtractions, and memory for N pieces of data. That means the present embodiment reduces multiplications by 85.8% or more, additions by 71.6% or more, and memory size by 93.8% or more as shown in FIG. 10. Especially, if N is greater than 8192, the additions, multiplications, and memory size are reduced by 99.9% or more.

Next will be described a transmitter based on a PO (pseudo orthogonal)-CI code set in place of a CI code set. In other words, the transmitter may be deigned to implement PO-CI; it is not necessarily designed to implement CI.

A PO-CI code set includes two CI code sets (code set 1 termed "CI$_1$," code set 2 termed "CI$_2$"). The second CI code set (CI$_2$) is a copy of CI$_1$. Each CI code set CI$_1$, CI$_2$ is orthogonal. CI$_1$ and CI$_2$ for the k-th data symbol on N subcarriers are given by Equation 21:

$$CI_1 = \{e^{j(2\pi/N) \cdot k \cdot 0}, e^{j(2\pi/N) \cdot k \cdot 1}, e^{j(2\pi/N) \cdot k \cdot 2}, \ldots, e^{j(2\pi/N) \cdot k \cdot (N-1)}\} \quad \text{[Equation 21]}$$

$$CI_2 = \{e^{j\{(2\pi/N) \cdot k \cdot 0 + \Delta\theta \cdot 0\}}, e^{j\{(2\pi/N) \cdot k \cdot 1 + \Delta\theta \cdot 1\}}, \ldots, e^{j\{(2\pi/N) \cdot k \cdot (N-1) + \Delta\theta \cdot (N-1)\}}\}$$

where k=0, 1, 2, . . . , N−1 for CI$_1$ and k=N, N+1, . . . , 2N−1 for CI$_2$. PO-CI is an extension code set (modulation code set). The code set is written as a matrix given in Equation 22. The output signals for the subcarriers are acquired by adding the code sets CI$_1$, CI$_2$. The column count indicates the number of pieces of data. The row count indicates the number of subcarriers.

$$CI_1 = \begin{pmatrix} 1 & 1 & \cdots & 1 & 1 \\ 1 & e^{j\frac{2\pi}{N} 1 \cdot 1} & \cdots & e^{j\frac{2\pi}{N}(N-2) \cdot 1} & e^{j\frac{2\pi}{N}(N-1) \cdot 1} \\ \vdots & \vdots & \ddots & \vdots & \vdots \\ 1 & e^{j\frac{2\pi}{N} 1 \cdot (N-2)} & \cdots & e^{j\frac{2\pi}{N}(N-2)(N-2)} & e^{j\frac{2\pi}{N}(N-1)(N-2)} \\ 1 & e^{j\frac{2\pi}{N} 1 \cdot (N-1)} & \cdots & e^{j\frac{2\pi}{N}(N-2)(N-1)} & e^{j\frac{2\pi}{N}(N-1)(N-1)} \end{pmatrix} \quad \text{[Equation 22]}$$

$$CI_2 = \begin{pmatrix} 1 & e^{j\left(\frac{2\pi}{N}(N+0) \cdot 1 + \frac{\pi}{N} \cdot 1\right)} & \cdots & e^{j\left(\frac{2\pi}{N}(N+0)(N-1) + \frac{\pi}{N}(N-1)\right)} \\ 1 & e^{j\left(\frac{2\pi}{N}(N+1) \cdot 1 + \frac{\pi}{N} \cdot 1\right)} & \cdots & e^{j\left(\frac{2\pi}{N}(N+1)(N-1) + \frac{\pi}{N}(N-1)\right)} \\ \vdots & \vdots & \ddots & \vdots \\ 1 & e^{j\left(\frac{2\pi}{N}(2N-2) \cdot 1 + \frac{\pi}{N} \cdot 1\right)} & \cdots & e^{j\left(\frac{2\pi}{N}(2N-2)(N-1) + \frac{\pi}{N}(N-1)\right)} \\ 1 & e^{j\left(\frac{2\pi}{N}(2N-1) \cdot 1 + \frac{\pi}{N} \cdot 1\right)} & \cdots & e^{j\left(\frac{2\pi}{N}(2N-1)(N-1) + \frac{\pi}{N}(N-1)\right)} \end{pmatrix}$$

The output signal for the n-th subcarrier is given by Equation 23:

$$s(n) = \sum_{k1=0}^{N-1} S_{k1} \cdot e^{j\frac{2\pi}{N} \cdot k1 \cdot n} + \sum_{k2=N}^{2N-1} S_{k2} \cdot e^{j\left(\frac{2\pi}{N} \cdot k2 \cdot n + \frac{\pi}{N} \cdot n\right)} \quad \text{[Equation 23]}$$

This output signal is N cyclic and therefore simplified to Equation 24:

$$s(n) = \sum_{k1=0}^{N-1} S_{k1} \cdot e^{j\frac{2\pi}{N} \cdot k1 \cdot n} + \left(e^{j\frac{\pi}{N} \cdot n}\right) \cdot \sum_{k1=0, k2=N}^{k1=N-1, k2=2N-1} S_{k2} \cdot e^{j\frac{2\pi}{N} \cdot k1 \cdot n} \quad \text{[Equation 24]}$$

As indicated in Equation 24, PO-CI can be written with only two IFFTs and a separate coefficient ($e^{j(\pi/N \cdot n)}$).

Figure 11:
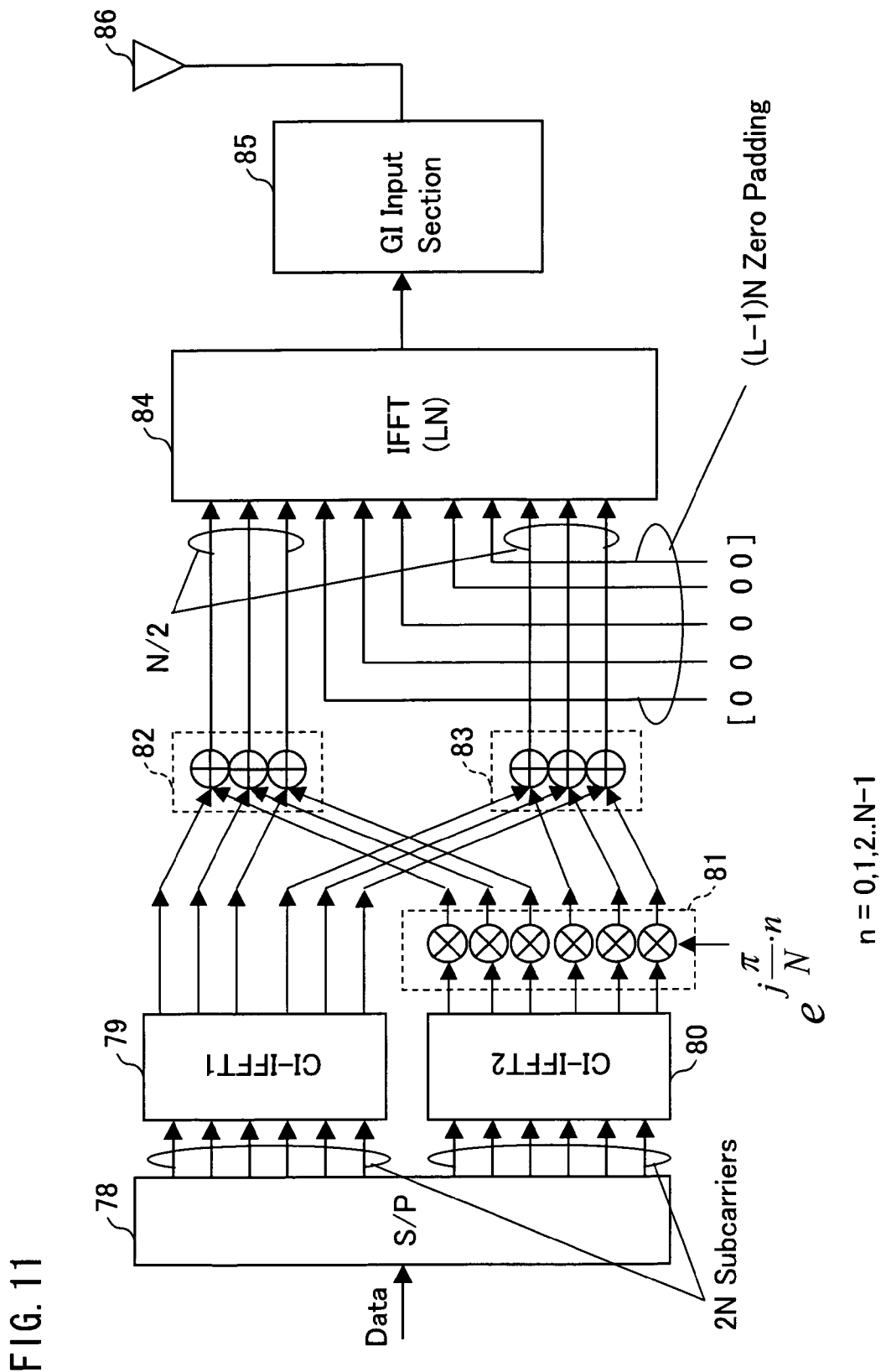
FIG. 11 is a block diagram schematically illustrating a structure of a transmitter based on PO-CI technology in accordance with an embodiment of the present invention.

A specific transmitter implementing PO-CI includes, as shown in FIG. 11, a serial-to-parallel converter section (S/P section; serial-to-parallel converter means) 78, a third IFFT section (second modulator means) 79, a fourth IFFT section (third modulator means) 80, a separator 81, a first group of computing elements 82, a second group of computing elements 83, a fifth IFFT section (first Inverse Fast Fourier Transform means) 84, a guard interval input section (GI input section) 85, and an antenna 86.

As shown in the figure, the PO-CI transmitter generates a CI code (elements) at two locations unlike the transmitter shown in FIG. 1. Hence, there are two data paths:

(i) S/P section 78→Third IFFT section 79→First group of computing elements 82/Second group of computing elements 83→Fifth IFFT section 84→GI input section 85→Antenna 86

(ii) S/P section 78→Fourth IFFT section 80→Separator 81 →First group of computing elements 82/Second group of computing elements 83→Fifth IFFT section 84→GI input section 85→Antenna 86

The outputs of the third IFFT section 79 and the separator 81 are divided into two groups: one of the groups is fed to the first group of computing elements 82, the other to the second group of computing elements 83.

The separator 81 is also provided. Since the PO-CI transmitter has two data paths, the first group of computing elements 82 and the second group of computing elements 83, each of which is a set of adders, are provided to add the outputs of the third IFFT section 79 to the outputs of the separator 81.

The major feature of the transmitter is the third IFFT section 79 and the fourth IFFT section 80. The provision of the IFFT sections 79, 80 produces at least the same effects as the transmitter shown in FIG. 1. The effects of the provision of the IFFT sections 79, 80 have been already explained; the description is not repeated here.

PO-CI has the following advantages over CI: (i) PO-CI doubles the throughput of OFDM. This is especially evident with BPSK (Binary Phase Shift Keying)-modulated data. (ii) PO-CI reduces PAPR in OFDM more than CI. (iii) PO-CI has two code sets, which allows for better interleaving architecture application to achieve higher BER performance over a fading channel.

Figure 12:
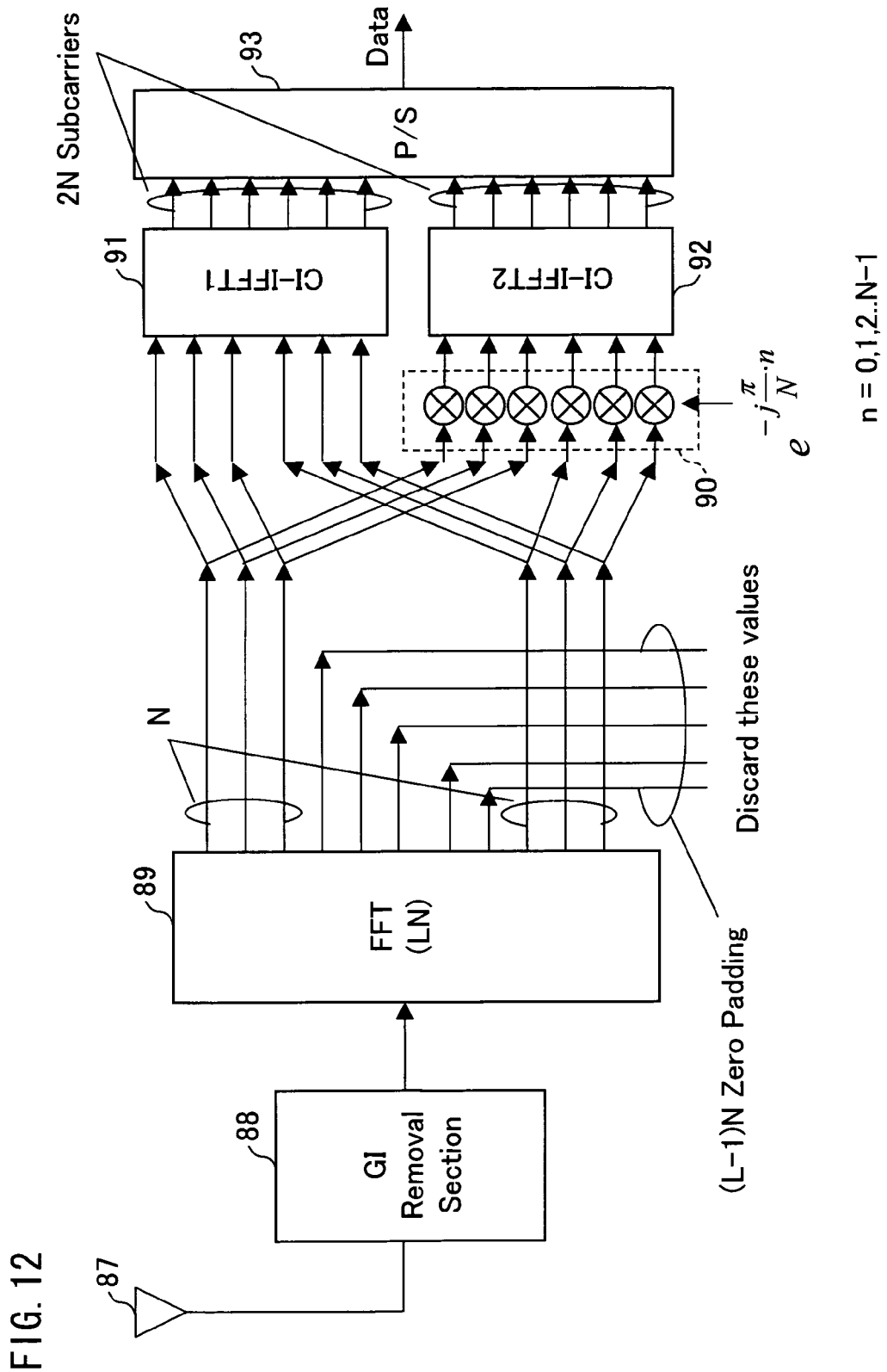
FIG. 12 is a block diagram schematically illustrating a structure of a receiver based on PO-CI technology in accordance with an embodiment of the present invention.

A PO-CI receiver includes, as shown in FIG. 12, an antenna 87, a GI removal section 88, a third FFT section (first Fast Fourier Transform means) 89, a separator 90, a fourth FFT section (fifth modulator means) 91, a fifth FFT section (sixth modulator means) 92, and a parallel-to-serial converter section (P/S section; parallel/serial section; parallel-to-serial converter means) 93.

The major feature of the receiver is the fourth FFT section 91 and the fifth FFT section 92. The provision of the FFT sections 91, 92 produces more effects than the receiver discussed earlier in reference to FIG. 9. Those effects are achieved for reasons similar for the effects of the PO-CI transmitter (see FIG. 11); the description is not repeated here.

FIG. 13 is a table showing that the receiver shown in FIG. 12 allows for simple design of PO-CI when compared to conventional technology. The transmitter shown in FIG. 11 achieves similar effects.

As can be seen in the figure, the CI-FFT of the present invention requires fewer multiplications, additions, and subtractions, and less memory than conventional CI-OFDM.

Calculation using the conventional CI code set in Equation 2 needs 2(N−1)×(N−1) multiplications, 2(N−1)×N+N additions, and memory for 2N×N pieces of data. In contrast, the present embodiment does not calculate all rotation factors and needs only 2(N/2)·log$_2$(N)+N multiplications, 2Nlog$_2$(N)+N additions and subtractions, and memory for 2N+N pieces of data. That means the present embodiment reduces multiplications by 84.4% or more, additions by 69.1% or more, and memory size by 90.6% or more as shown in FIG. 13.

On the PO-CI receiver, the CI is readily implemented using Equation 25 below in place of the matrix of Equation 22 and the expression of Equation 26 which represents a separator.

$$\begin{pmatrix} 1 & 1 & \ldots & 1 & 1 \\ 1 & e^{-j\frac{2\pi}{N}1\cdot 1} & \ldots & e^{-j\frac{2\pi}{N}(N-2)\cdot 1} & e^{-j\frac{2\pi}{N}(N-1)\cdot 1} \\ \vdots & \vdots & \ddots & \vdots & \vdots \\ 1 & e^{-j\frac{2\pi}{N}1\cdot(N-2)} & \ldots & e^{-j\frac{2\pi}{N}(N-2)\cdot(N-2)} & e^{-j\frac{2\pi}{N}(N-1)\cdot(N-2)} \\ 1 & e^{-j\frac{2\pi}{N}1\cdot(N-1)} & \ldots & e^{-j\frac{2\pi}{N}(N-2)\cdot(N-1)} & e^{-j\frac{2\pi}{N}(N-1)\cdot(N-1)} \end{pmatrix}$$
[Equation 25]

$$\begin{pmatrix} 1 & e^{-j\left(\frac{2\pi}{N}(N+0)\cdot 1+\frac{\pi}{N}\cdot 1\right)} & \ldots & e^{-j\left(\frac{2\pi}{N}(N+0)\cdot(N-1)+\frac{\pi}{N}\cdot(N-1)\right)} \\ 1 & e^{-j\left(\frac{2\pi}{N}(N+1)\cdot 1+\frac{\pi}{N}\cdot 1\right)} & \ldots & e^{-j\left(\frac{2\pi}{N}(N+1)\cdot(N-1)+\frac{\pi}{N}\cdot(N-1)\right)} \\ \vdots & \vdots & \ddots & \vdots \\ 1 & e^{-j\left(\frac{2\pi}{N}(2N-2)\cdot 1+\frac{\pi}{N}\cdot 1\right)} & \ldots & e^{-j\left(\frac{2\pi}{N}(2N-2)\cdot(N-1)+\frac{\pi}{N}\cdot(N-1)\right)} \\ 1 & e^{-j\left(\frac{2\pi}{N}(2N-1)\cdot 1+\frac{\pi}{N}\cdot 1\right)} & \ldots & e^{-j\left(\frac{2\pi}{N}(2N-1)\cdot(N-1)+\frac{\pi}{N}\cdot(N-1)\right)} \end{pmatrix}$$

$$e^{-j\frac{\pi}{N}\cdot n}$$
[Equation 26]

Next, MMSE (minimum mean square error) will be described. There needs to be provided a working combiner in the receiver to maximize frequency diversity benefit for the restoration of orthogonality in a multipath fading environment. This is optimally done by MMSE which is resistant to fading. For a multipath fading channel, MMSE is similar to ML (maximum likelihood) and exhibits semi-optimal performance.

Figure 14:
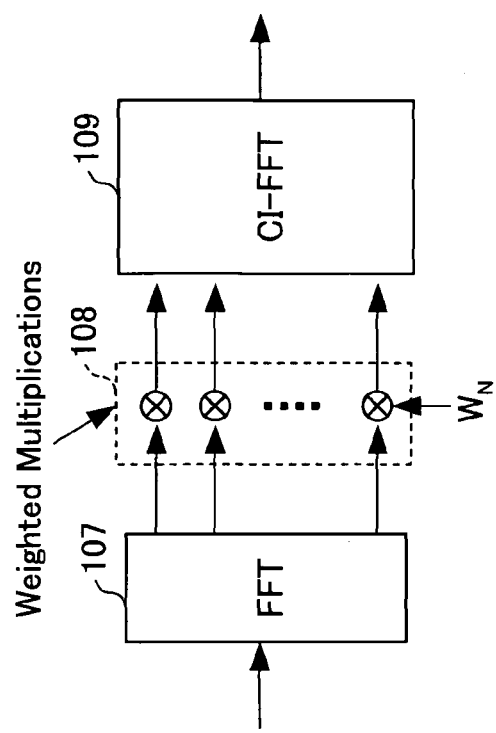
FIG. 14(a) is a diagram of a configuration for conventional MMSE as a comparative example.
FIG. 14(b) is a diagram of a configuration for MMSE of the present embodiment.
Figure 14:
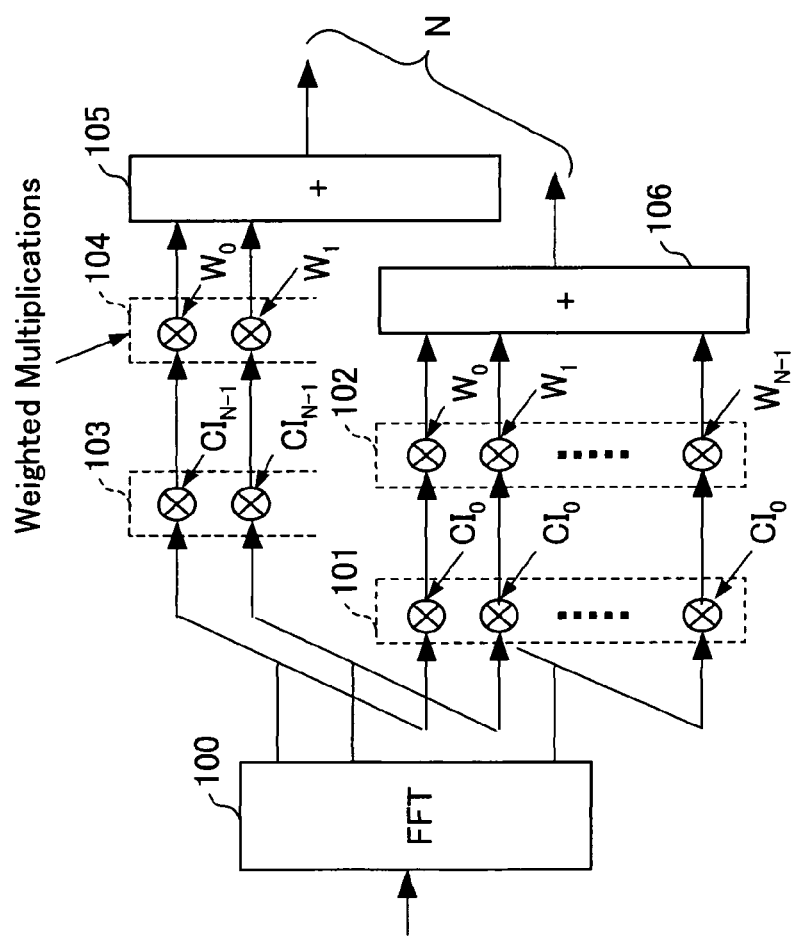

FIG. 14(a) shows a configuration for conventional MMSE as a comparative example. As shown in the diagram, conventional MMSE includes an FFT section 100, weighted multiplications 101, 102, 103, 104, and summation sections 105; 106 which sum up the outputs from the weighted multiplications 101, 102, 103, 104.

FIG. 14(b) shows a configuration for the MMSE of the present invention. As shown in the diagram, the MMSE of the present invention includes a first FFT section 107, a weighted multiplication 108, and a second FFT section 109. Owing to the provision of the second FFT section 109 as in the diagram, the MMSE of the present invention has only to perform a single round of weighted multiplications. That simplifies the MMSE configuration.

Figures 15A, 15B:
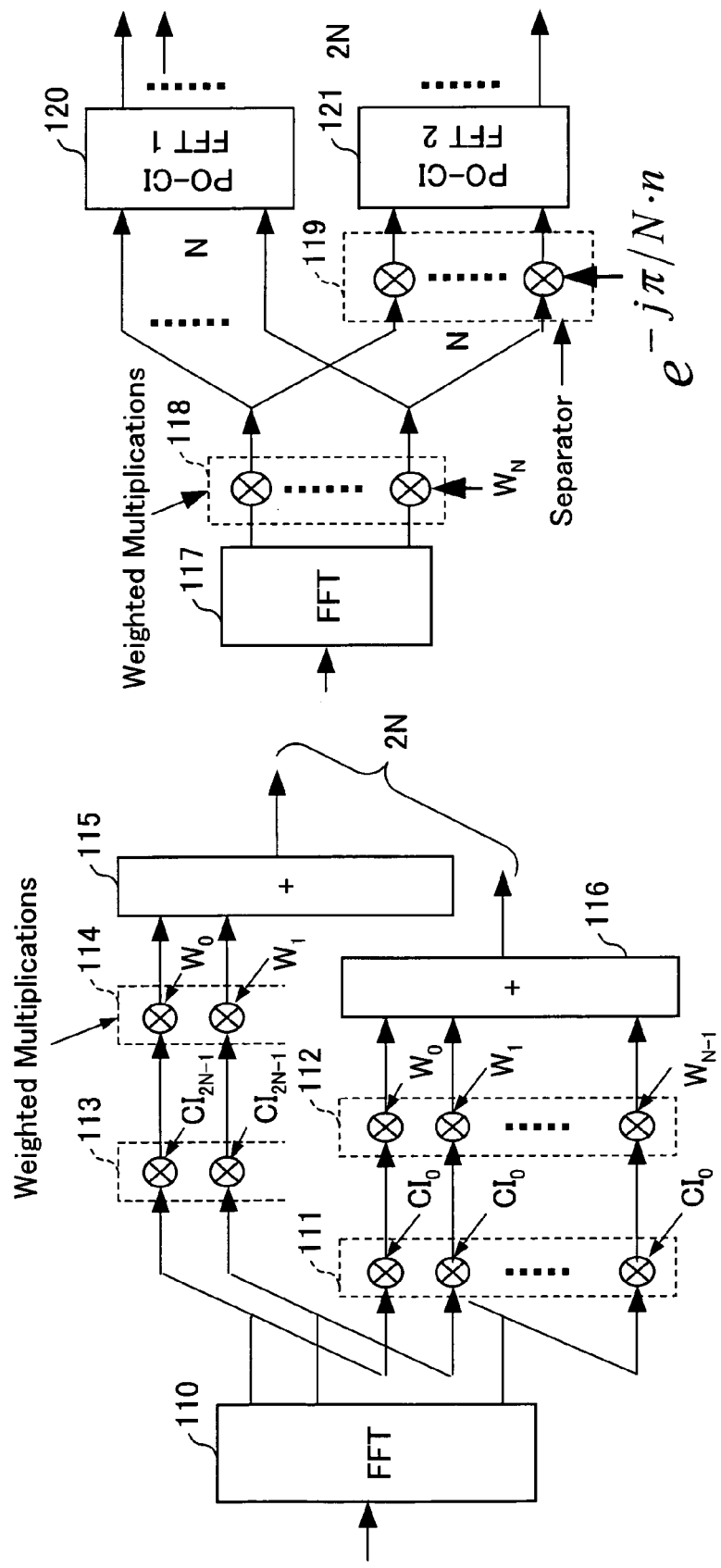
FIG. 15(a) is a diagram of a configuration for conventional PO-CI MMSE as a comparative example.
FIG. 15(b) is a diagram of a configuration for PO-CI MMSE of the present embodiment.

FIG. 15(a) shows a configuration for conventional PO-CI MMSE as a comparative example. As shown in the diagram, conventional PO-CI MMSE includes a FFT section 110, weighted multiplications 111, 112, 113, 114, and summation sections 115, 116. FIG. 15(b) shows a configuration for the PO-CI MMSE of the present invention. As shown in the diagram, the PO-CI MMSE of the present invention includes a first FFT section 117, a weighted multiplication 118, a separator 119, a second FFT section 120, and another second FFT section 121. Owing to the provision of the first FFT section 118, the PO-CI MMSE of the present invention has only to perform a single round of weighted multiplications. That simplifies the configuration of the PO-CI MMSE.

Figure 16:
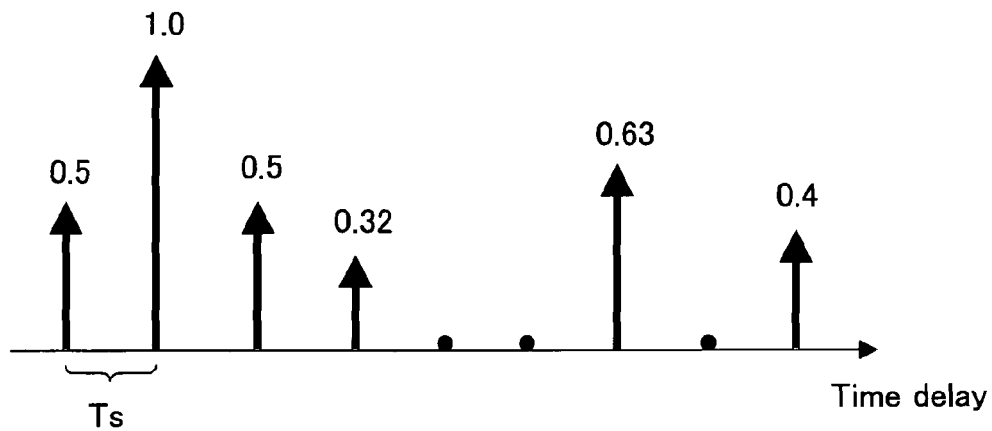
FIG. 16 is a diagram showing a BU (Bad Urban) electric power delay profile in a COST-207 fading model.
Figure 17:
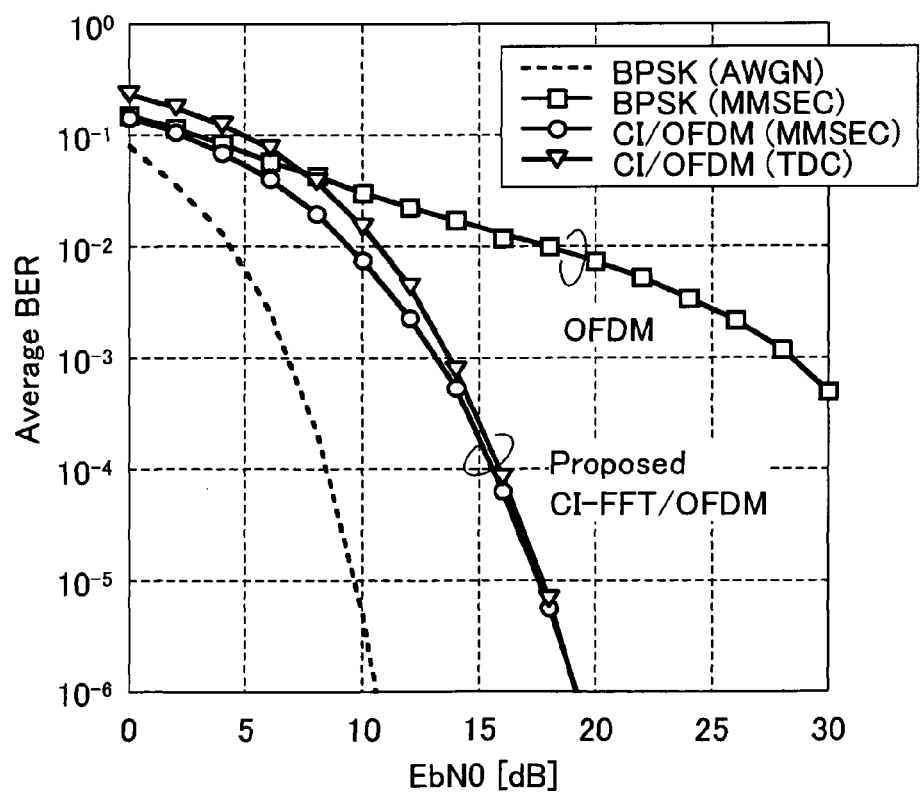
FIG. 17 is a graph representing effects of CI-FET in an embodiment of the present invention.
Figure 18:
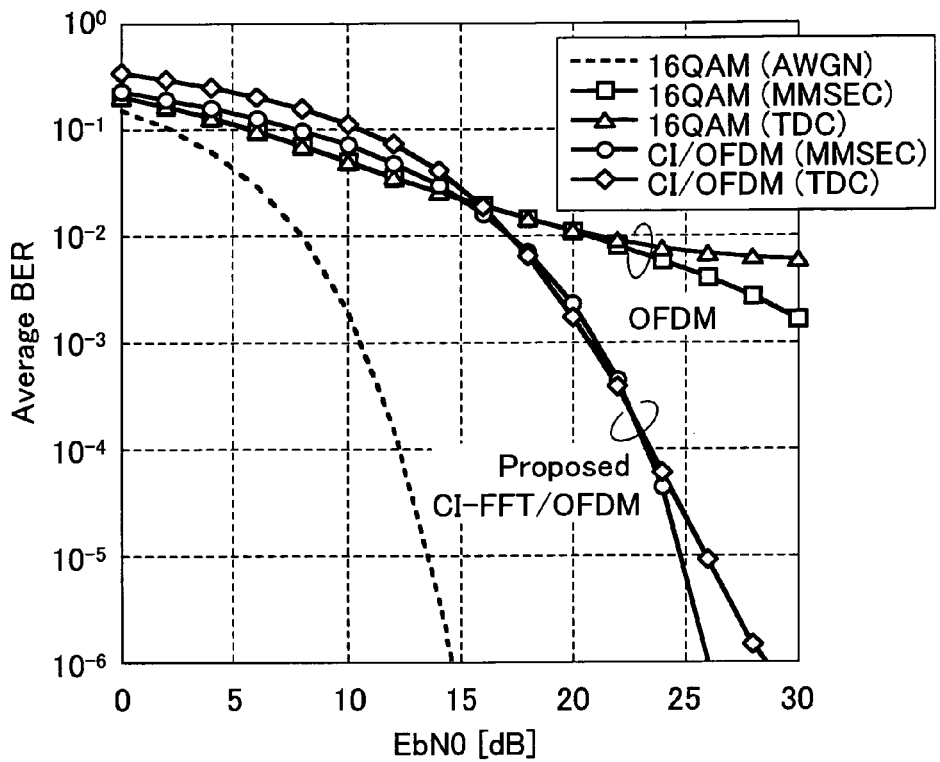
FIG. 18 is a graph representing effects of CI-FFT in an embodiment of the present invention.
Figure 19:
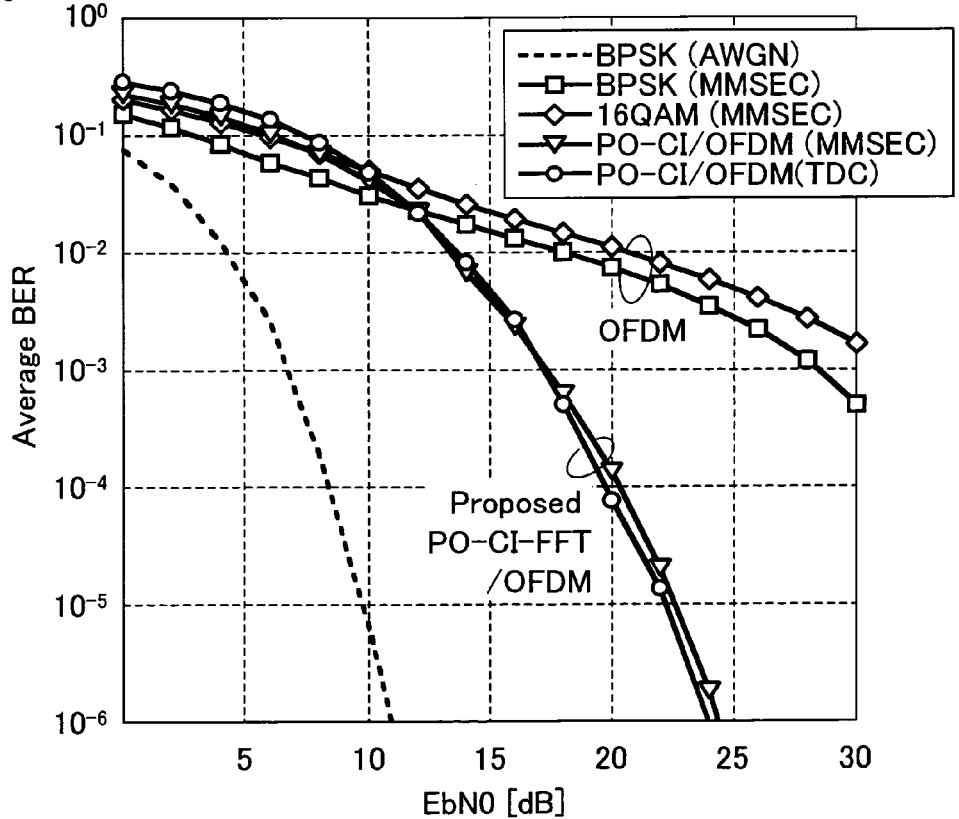
FIG. 19 is a graph representing effects of PO-CI-FET in an embodiment of the present invention.
Figure 20:
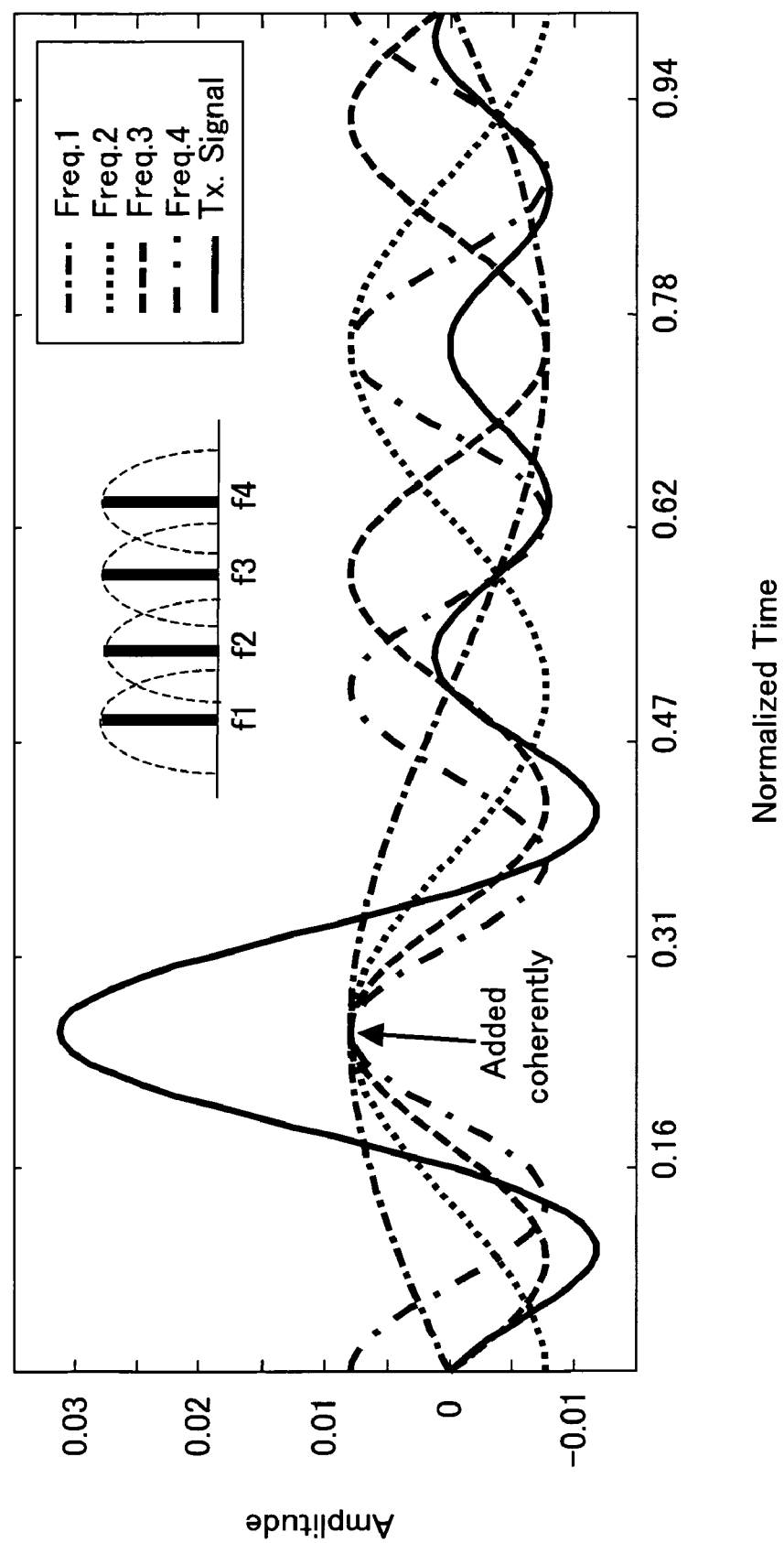
FIG. 20 is an illustration showing an occurrence of PAPR in conventional OFDM.
Figure 21:
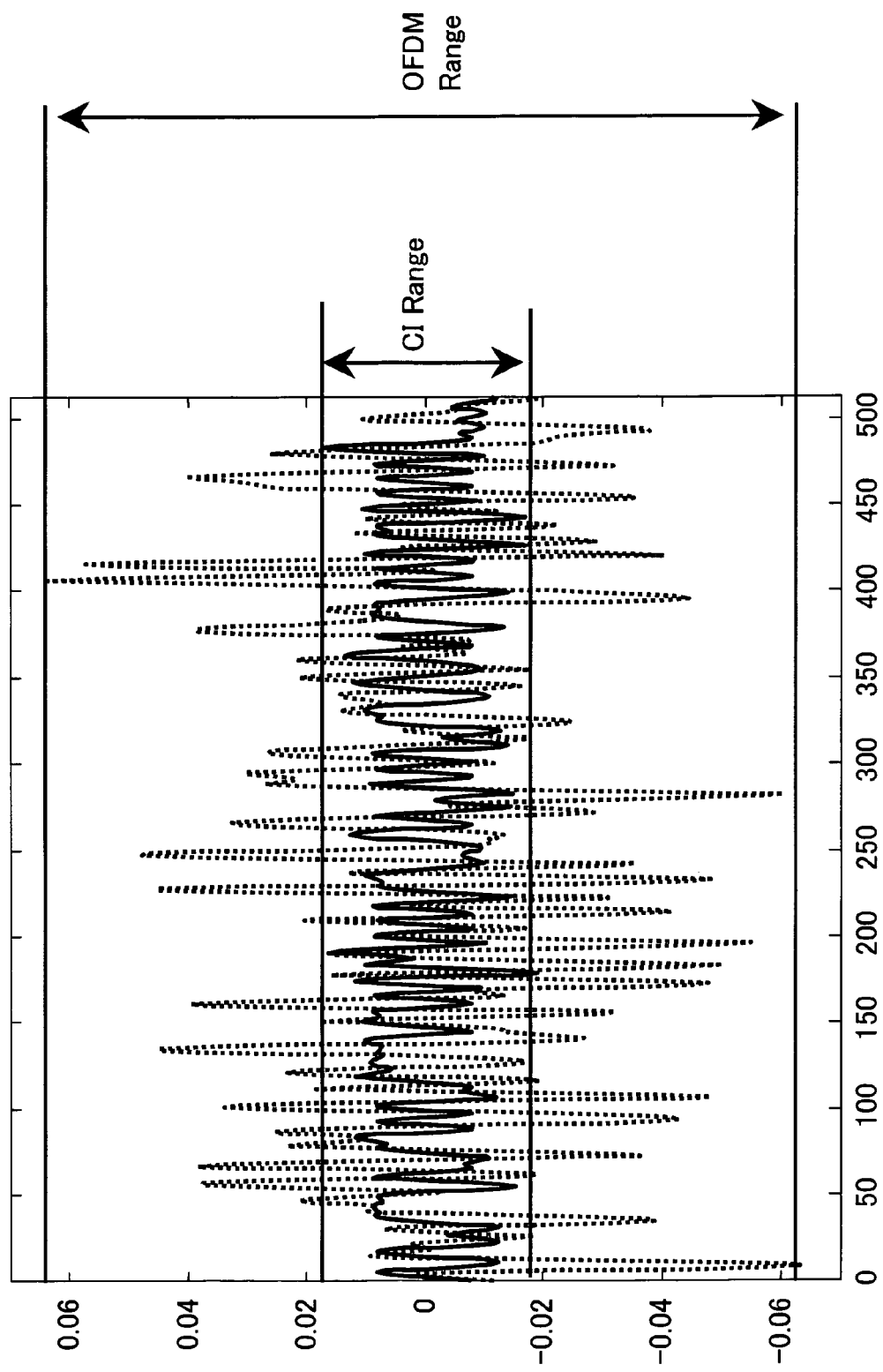
FIG. 21 is an illustration showing effects of CI-OFDM.
Figure 22:
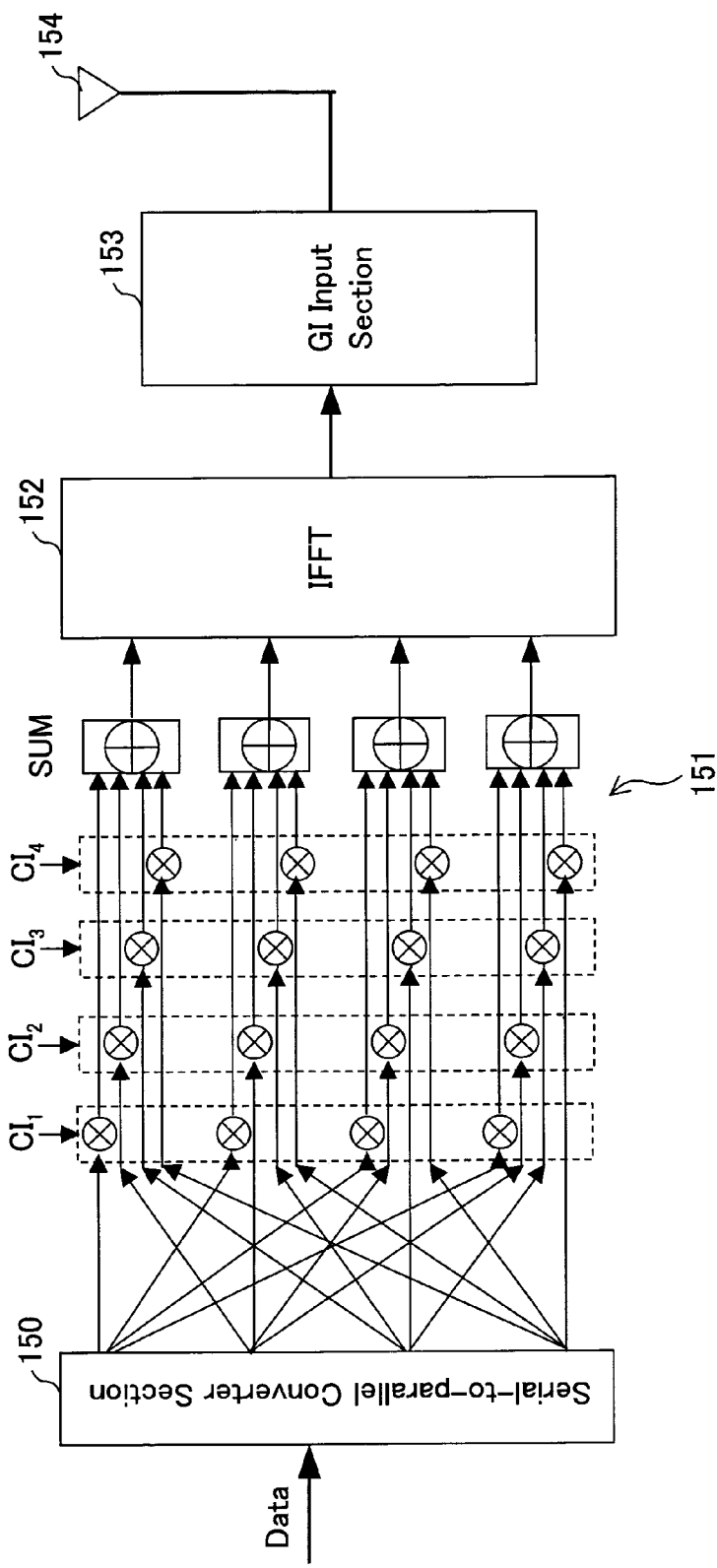
FIG. 22 is a diagram of a transmitter based on conventional CI-OFDM.
Figure 23:
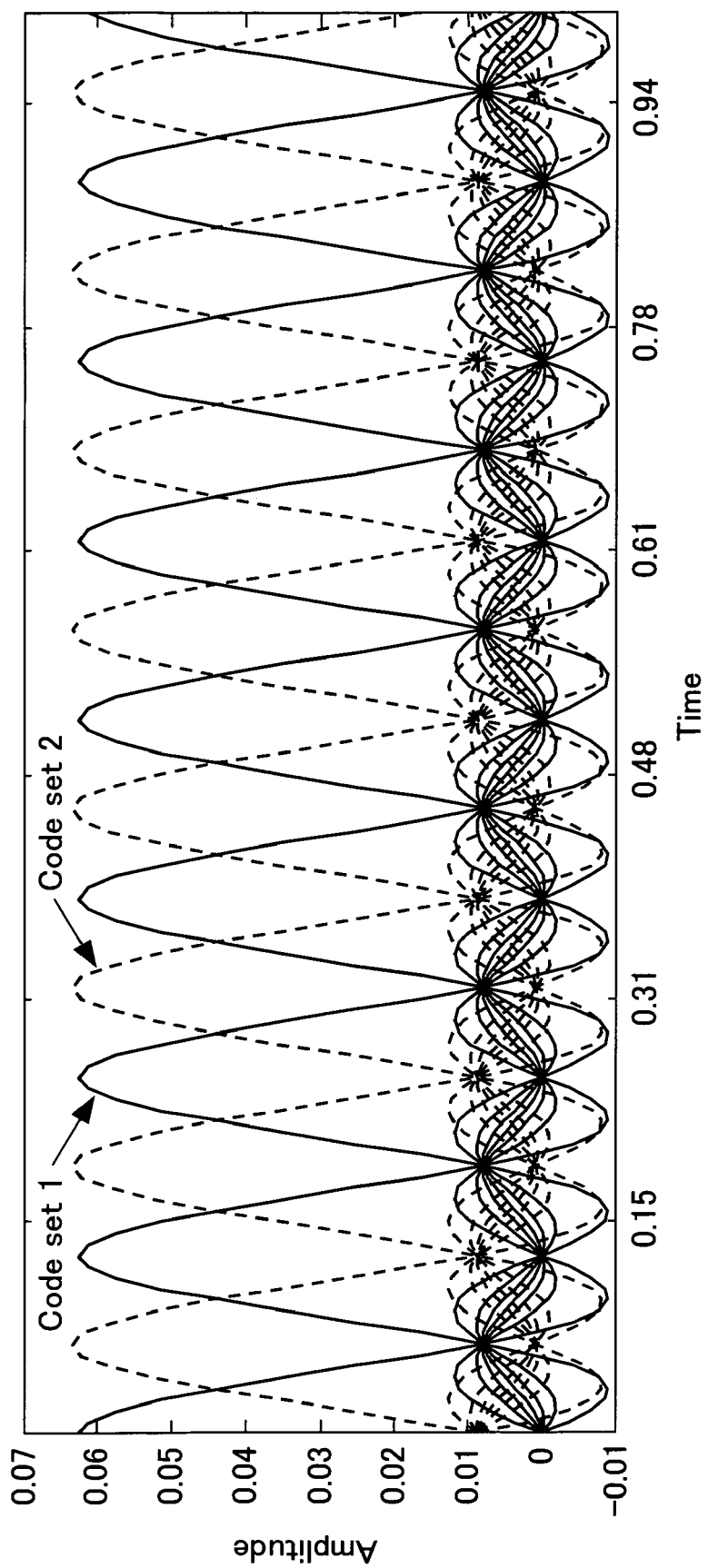
FIG. 23 is waveform diagram based on PO-CI-OFDM.

FIG. 16 is a diagram showing a BU (Bad Urban) electric power delay profile in a COST-207 fading model. FIGS. 17 to 19 are graphs showing effects of the CI and PO-CI of the present invention.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The transmitter and the receiver of the present invention are particularly suitable for applications in terrestrial digital TV broadcast.

The invention claimed is:
1. A transmitter, comprising:
   serial-to-parallel converter means for converting original serial data to parallel data which will correspond to a plurality of subcarriers;
   first Inverse Fast Fourier Transform means for converting the parallel data received from the serial-to-parallel converter means from the frequency domain to the time domain, wherein the parallel data is received in 2 groups of N/2, where N is the number of the plurality of subcarriers; and
   first modulator means, disposed between the serial-to-parallel converter means and the first Inverse Fast Fourier Transform means, for modulating the plurality of subcarriers using elements of a matrix derived from an expression for Fourier Transform involving time domain signal levels and frequency domain signal levels.

2. The transmitter of claim 1, wherein the expression is written $$s(n) = \frac{1}{\sqrt{N}} \sum_{k=0}^{N-1} S_k e^{j(2\pi/N)\cdot k \cdot n},$$

$$n = 0, 1, 2, \ldots, N-1$$

where s(n) is a time domain signal, $S_k$ is a frequency domain signal, and k is a bit number.

3. The transmitter of claim 1, wherein the matrix is written $$IDFT_{N \times N} = \frac{1}{\sqrt{N}} \begin{pmatrix} 1 & 1 & \cdots & 1 & 1 \\ 1 & e^{j\frac{2\pi}{N} 1 \cdot 1} & \cdots & e^{j\frac{2\pi}{N}(N-2) \cdot 1} & e^{j\frac{2\pi}{N}(N-1) \cdot 1} \\ \vdots & \vdots & \ddots & \vdots & \vdots \\ 1 & e^{j\frac{2\pi}{N} 1 \cdot (N-2)} & \cdots & e^{j\frac{2\pi}{N}(N-2) \cdot (N-2)} & e^{j\frac{2\pi}{N}(N-1) \cdot (N-2)} \\ 1 & e^{j\frac{2\pi}{N} 1 \cdot (N-1)} & \cdots & e^{j\frac{2\pi}{N}(N-2) \cdot (N-1)} & e^{j\frac{2\pi}{N}(N-1) \cdot (N-1)} \end{pmatrix}.$$

4. The transmitter of claims 1, wherein: the matrix is made up of two matrices; the first modulator means includes a second modulator and a third modulator; and the transmitter further comprises a separator after the third modulator.

5. The transmitter of claim 4, wherein:
the two matrices are written $$\begin{pmatrix} 1 & 1 & \cdots & 1 & 1 \\ 1 & e^{j\frac{2\pi}{N} 1 \cdot 1} & \cdots & e^{j\frac{2\pi}{N}(N-2) \cdot 1} & e^{j\frac{2\pi}{N}(N-1) \cdot 1} \\ \vdots & \vdots & \ddots & \vdots & \vdots \\ 1 & e^{j\frac{2\pi}{N} 1 \cdot (N-2)} & \cdots & e^{j\frac{2\pi}{N}(N-2) \cdot (N-2)} & e^{j\frac{2\pi}{N}(N-1) \cdot (N-2)} \\ 1 & e^{j\frac{2\pi}{N} 1 \cdot (N-1)} & \cdots & e^{j\frac{2\pi}{N}(N-2) \cdot (N-1)} & e^{j\frac{2\pi}{N}(N-1) \cdot (N-1)} \end{pmatrix}$$

$$\begin{pmatrix} 1 & e^{j\left(\frac{2\pi}{N}(N+0) \cdot 1 + \frac{\pi}{N} \cdot 1\right)} & \cdots & e^{j\left(\frac{2\pi}{N}(N+0) \cdot (N-1) + \frac{\pi}{N} \cdot (N-1)\right)} \\ 1 & e^{j\left(\frac{2\pi}{N}(N+1) \cdot 1 + \frac{\pi}{N} \cdot 1\right)} & \cdots & e^{j\left(\frac{2\pi}{N}(N+1) \cdot (N-1) + \frac{\pi}{N} \cdot (N-1)\right)} \\ \vdots & \vdots & \ddots & \vdots \\ 1 & e^{j\left(\frac{2\pi}{N}(2N-2) \cdot 1 + \frac{\pi}{N} \cdot 1\right)} & \cdots & e^{j\left(\frac{2\pi}{N}(2N-2) \cdot (N-1) + \frac{\pi}{N} \cdot (N-1)\right)} \\ 1 & e^{j\left(\frac{2\pi}{N}(2N-1) \cdot 1 + \frac{\pi}{N} \cdot 1\right)} & \cdots & e^{j\left(\frac{2\pi}{N}(2N-1) \cdot (N-1) + \frac{\pi}{N} \cdot (N-1)\right)} \end{pmatrix}$$

and
the separator is given by an expression:

$$e^{j\frac{\pi}{N} \cdot n}.$$

6. The transmitter of claim 4, wherein:
the Fourier Transform is Inverse Fast Fourier Transform; and
the first modulator means performs only $2N \cdot \log_2(N) + N$ additions and subtractions where N is the number of the plurality of subcarriers.

7. The transmitter of claim 1, wherein the first modulator means modulates the plurality of subcarriers by Discrete Inverse Fourier Transform or Inverse Fast Fourier Transform.

8. The transmitter of claim 1, wherein:
the Fourier Transform is Inverse Fast Fourier Transform; and
the first modulator means performs only $N \cdot \log_2(N)$ additions and subtractions where N is the number of the plurality of subcarriers.

9. A receiver, comprising:
first Fast Fourier Transform means for converting original data from the time domain to the frequency domain;
parallel-to-serial converter means for converting, to serial data, parallel data which will correspond to a plurality of subcarriers supplied from the first Fast Fourier Transform means, wherein the parallel data is received in 2 groups of N/2, where N is the number of the plurality of subcarriers; and
first modulator means, disposed between the first Fast Fourier Transform means and the parallel-to-serial converter means, for modulating the plurality of subcarriers using elements of a matrix derived from an expression for Fourier Transform involving time domain signal levels and frequency domain signal levels.

10. The receiver of claim 9, wherein the expression is written $$s(n) = \frac{1}{\sqrt{N}} \sum_{k=0}^{N-1} S_k e^{-j(2\pi/N) \cdot k \cdot n},$$

$$n = 0, 1, 2, \ldots, N-1$$

where s(n) is a time domain signal, $S_k$ is a frequency domain signal, and k is a bit number.

11. The receiver of claim 9, wherein the matrix is written $$DFT_{N \times N} =$$

$$\frac{1}{\sqrt{N}} \begin{pmatrix} 1 & 1 & \cdots & 1 & 1 \\ 1 & e^{-j\frac{2\pi}{N} 1 \cdot 1} & \cdots & e^{-j\frac{2\pi}{N}(N-2) \cdot 1} & e^{-j\frac{2\pi}{N}(N-1) \cdot 1} \\ \vdots & \vdots & \ddots & \vdots & \vdots \\ 1 & e^{-j\frac{2\pi}{N} 1 \cdot (N-2)} & \cdots & e^{-j\frac{2\pi}{N}(N-2) \cdot (N-2)} & e^{-j\frac{2\pi}{N}(N-1) \cdot (N-2)} \\ 1 & e^{-j\frac{2\pi}{N} 1 \cdot (N-1)} & \cdots & e^{-j\frac{2\pi}{N}(N-2) \cdot (N-1)} & e^{-j\frac{2\pi}{N}(N-1) \cdot (N-1)} \end{pmatrix}.$$

12. The receiver of claim 9, wherein: the matrix is made up of two matrices; the first modulator means includes a second modulator and third modulator; and the receiver further comprises a separator before the third modulator.

13. The receiver of claim 12, wherein:
the two matrices are written $$\begin{pmatrix} 1 & 1 & \cdots & 1 & 1 \\ 1 & e^{-j\frac{2\pi}{N} 1 \cdot 1} & \cdots & e^{-j\frac{2\pi}{N}(N-2) \cdot 1} & e^{-j\frac{2\pi}{N}(N-1) \cdot 1} \\ \vdots & \vdots & \ddots & \vdots & \vdots \\ 1 & e^{-j\frac{2\pi}{N} 1 \cdot (N-2)} & \cdots & e^{-j\frac{2\pi}{N}(N-2) \cdot (N-2)} & e^{-j\frac{2\pi}{N}(N-1) \cdot (N-2)} \\ 1 & e^{-j\frac{2\pi}{N} 1 \cdot (N-1)} & \cdots & e^{-j\frac{2\pi}{N}(N-2) \cdot (N-1)} & e^{-j\frac{2\pi}{N}(N-1) \cdot (N-1)} \end{pmatrix}$$

$$\begin{pmatrix} 1 & e^{-j\left(\frac{2\pi}{N}(N+0) \cdot 1 + \frac{\pi}{N} \cdot 1\right)} & \cdots & e^{-j\left(\frac{2\pi}{N}(N+0) \cdot (N-1) + \frac{\pi}{N} \cdot (N-1)\right)} \\ 1 & e^{-j\left(\frac{2\pi}{N}(N+1) \cdot 1 + \frac{\pi}{N} \cdot 1\right)} & \cdots & e^{-j\left(\frac{2\pi}{N}(N+1) \cdot (N-1) + \frac{\pi}{N} \cdot (N-1)\right)} \\ \vdots & \vdots & \ddots & \vdots \\ 1 & e^{-j\left(\frac{2\pi}{N}(2N-2) \cdot 1 + \frac{\pi}{N} \cdot 1\right)} & \cdots & e^{-j\left(\frac{2\pi}{N}(2N-2) \cdot (N-1) + \frac{\pi}{N} \cdot (N-1)\right)} \\ 1 & e^{-j\left(\frac{2\pi}{N}(2N-1) \cdot 1 + \frac{\pi}{N} \cdot 1\right)} & \cdots & e^{-j\left(\frac{2\pi}{N}(2N-1) \cdot (N-1) + \frac{\pi}{N} \cdot (N-1)\right)} \end{pmatrix}$$

and
the separator is given by an expression:

$$e^{-j\frac{\pi}{N} \cdot n}.$$

14. The receiver of claim 12, wherein the first modulator means modulates the plurality of subcarriers by Discrete Fourier Transform or Fast Fourier Transform.

15. The receiver of claim 12, wherein:
the Fourier Transform is Fast Fourier Transform; and
the first modulator means performs only $2N \cdot \log_2(N)+N$ additions and subtractions where N is the number of the plurality of subcarriers.

16. The receiver of claim 9, wherein:
the Fourier Transform is Fast Fourier Transform; and
the first modulator means performs only $N \cdot \log_2(N)$ additions and subtractions where N is the number of the plurality of subcarriers.

17. A transmitter, comprising: serial-to-parallel converter means for converting original serial data to parallel data which will correspond to a plurality of subcarriers; first Inverse Fast Fourier Transform means for converting the parallel data received from the serial-to-parallel converter means from the frequency domain to the time domain; and first modulator means, disposed between the serial-to-parallel converter means and the first Inverse Fast Fourier Transform means, for modulating the plurality of subcarriers using elements of a matrix derived from an expression for Fourier Transform involving time domain signal levels and frequency domain signal levels, wherein the matrix is made up of two matrices, the first modulator means includes a second modulator and a third modulator, and the transmitter further comprises a separator after the third modulator, wherein the two matrices are written $$\begin{pmatrix} 1 & 1 & \ldots & 1 & 1 \\ 1 & e^{j\frac{2\pi}{N}1\cdot 1} & \ldots & e^{j\frac{2\pi}{N}(N-2)\cdot 1} & e^{j\frac{2\pi}{N}(N-1)\cdot 1} \\ \vdots & \vdots & \ddots & \vdots & \vdots \\ 1 & e^{j\frac{2\pi}{N}1\cdot(N-2)} & \ldots & e^{j\frac{2\pi}{N}(N-2)\cdot(N-2)} & e^{j\frac{2\pi}{N}(N-1)\cdot(N-2)} \\ 1 & e^{j\frac{2\pi}{N}1\cdot(N-1)} & \ldots & e^{j\frac{2\pi}{N}(N-2)\cdot(N-1)} & e^{j\frac{2\pi}{N}(N-1)\cdot(N-2)} \end{pmatrix}$$

$$\begin{pmatrix} 1 & e^{j\left(\frac{2\pi}{N}(N+0)\cdot 1+\frac{\pi}{N}\cdot 1\right)} & \ldots & e^{j\left(\frac{2\pi}{N}(N+0)\cdot(N-1)+\frac{\pi}{N}\cdot(N-1)\right)} \\ 1 & e^{j\left(\frac{2\pi}{N}(N+1)\cdot 1+\frac{\pi}{N}\cdot 1\right)} & \ldots & e^{j\left(\frac{2\pi}{N}(N+1)\cdot(N-1)+\frac{\pi}{N}\cdot(N-1)\right)} \\ \vdots & \vdots & \ddots & \vdots \\ 1 & e^{j\left(\frac{2\pi}{N}(2N-2)\cdot 1+\frac{\pi}{N}\cdot 1\right)} & \ldots & e^{j\left(\frac{2\pi}{N}(2N-2)\cdot(N-1)+\frac{\pi}{N}\cdot(N-1)\right)} \\ 1 & e^{j\left(\frac{2\pi}{N}(2N-1)\cdot 1+\frac{\pi}{N}\cdot 1\right)} & \ldots & e^{j\left(\frac{2\pi}{N}(2N-1)\cdot(N-1)+\frac{\pi}{N}\cdot(N-1)\right)} \end{pmatrix}$$

and
the separator is given by an expression:

$$e^{j\frac{\pi}{N}\cdot n}.$$

18. A receiver, comprising: first Fast Fourier Transform means for converting original data from the time domain to the frequency domain; parallel-to-serial converter means for converting, to serial data, parallel data which will correspond to a plurality of subcarriers supplied from the first Fast Fourier Transform means; and first modulator means, disposed between the first Fast Fourier Transform means and the parallel-to-serial converter means, for modulating the plurality of subcarriers using elements of a matrix derived from an expression for Fourier Transform involving time domain signal levels and frequency domain signal levels, wherein the matrix is made up of two matrices, the first modulator means includes a second modulator and a third modulator, and the receiver further comprises a separator before the third modulator, wherein the two matrices are written $$\begin{pmatrix} 1 & 1 & \ldots & 1 & 1 \\ 1 & e^{-j\frac{2\pi}{N}1\cdot 1} & \ldots & e^{-j\frac{2\pi}{N}(N-2)\cdot 1} & e^{-j\frac{2\pi}{N}(N-1)\cdot 1} \\ \vdots & \vdots & \ddots & \vdots & \vdots \\ 1 & e^{-j\frac{2\pi}{N}1\cdot(N-2)} & \ldots & e^{-j\frac{2\pi}{N}(N-2)\cdot(N-2)} & e^{-j\frac{2\pi}{N}(N-1)\cdot(N-2)} \\ 1 & e^{-j\frac{2\pi}{N}1\cdot(N-1)} & \ldots & e^{-j\frac{2\pi}{N}(N-2)\cdot(N-1)} & e^{-j\frac{2\pi}{N}(N-1)\cdot(N-2)} \end{pmatrix}$$

$$\begin{pmatrix} 1 & e^{-j\left(\frac{2\pi}{N}(N+0)\cdot 1+\frac{\pi}{N}\cdot 1\right)} & \ldots & e^{-j\left(\frac{2\pi}{N}(N+0)\cdot(N-1)+\frac{\pi}{N}\cdot(N-1)\right)} \\ 1 & e^{-j\left(\frac{2\pi}{N}(N+1)\cdot 1+\frac{\pi}{N}\cdot 1\right)} & \ldots & e^{-j\left(\frac{2\pi}{N}(N+1)\cdot(N-1)+\frac{\pi}{N}\cdot(N-1)\right)} \\ \vdots & \vdots & \ddots & \vdots \\ 1 & e^{-j\left(\frac{2\pi}{N}(2N-2)\cdot 1+\frac{\pi}{N}\cdot 1\right)} & \ldots & e^{-j\left(\frac{2\pi}{N}(2N-2)\cdot(N-1)+\frac{\pi}{N}\cdot(N-1)\right)} \\ 1 & e^{-j\left(\frac{2\pi}{N}(2N-1)\cdot 1+\frac{\pi}{N}\cdot 1\right)} & \ldots & e^{-j\left(\frac{2\pi}{N}(2N-1)\cdot(N-1)+\frac{\pi}{N}\cdot(N-1)\right)} \end{pmatrix}$$

and
the separator is given by an expression;

$$e^{-j\frac{\pi}{N}\cdot n}.$$

* * * * *

UNITED STATES PATENT AND TRADEMARK OFFICE
CERTIFICATE OF CORRECTION

PATENT NO. : 7,804,764 B2
APPLICATION NO. : 11/989869
DATED : September 28, 2010
INVENTOR(S) : Takao Hara et al.

It is certified that error appears in the above-identified patent and that said Letters Patent is hereby corrected as shown below:

Title Page insert Item (30)

-- (30)   Foreign Application Priority Data

August 3, 2005         (JP) ............ 2005-225604 --

Signed and Sealed this

Thirtieth Day of November, 2010

David J. Kappos
*Director of the United States Patent and Trademark Office*